(12) United States Patent
Shin et al.

(10) Patent No.: US 11,889,523 B2
(45) Date of Patent: Jan. 30, 2024

(54) METHOD AND APPARATUS FOR TRANSMITTING UPLINK CHANNEL IN WIRELESS COMMUNICATION SYSTEM

(71) Applicant: Samsung Electronics Co., Ltd., Suwon-si (KR)

(72) Inventors: Cheolkyu Shin, Suwon-si (KR); Youngbum Kim, Suwon-si (KR); Hyunseok Ryu, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 17/450,954

(22) Filed: Oct. 14, 2021

(65) Prior Publication Data

US 2022/0116919 A1    Apr. 14, 2022

(30) Foreign Application Priority Data

Oct. 14, 2020 (KR) .......................... 10-2020-0132597

(51) Int. Cl.
*H04W 72/23*      (2023.01)
*H04L 5/00*       (2006.01)
*H04W 72/0453*    (2023.01)

(52) U.S. Cl.
CPC .......... *H04W 72/23* (2023.01); *H04L 5/0048* (2013.01); *H04L 5/0094* (2013.01); *H04W 72/0453* (2013.01)

(58) Field of Classification Search
CPC . H04W 72/23; H04W 72/231; H04W 72/232; H04W 72/0453
See application file for complete search history.

(56) References Cited

U.S. PATENT DOCUMENTS

| | | |
|---|---|---|
| 2018/0279299 A1 | 9/2018 | Park et al. |
| 2019/0014561 A1* | 1/2019 | Takeda ................. H04L 5/0044 |
| 2019/0200326 A1* | 6/2019 | Shin ..................... H04L 5/0051 |
| 2020/0068608 A1 | 2/2020 | Ye et al. |
| 2020/0100316 A1 | 3/2020 | Liu et al. |
| 2020/0280406 A1 | 9/2020 | Medina Acosta et al. |

FOREIGN PATENT DOCUMENTS

KR    10-2021-0095430 A    8/2021

OTHER PUBLICATIONS

International Search Report and Written Opinion of the International Searching Authority in connection with International Application No. PCT/KR2021/014187 dated Jan. 17, 2022, 6 pages.
Futurewei, "Miscellaneous corrections for Rel-16 eMTC features in 36.212", R1-2005174, 3GPP TSG-RAN WG1 Meeting #101-e, e-Meeting, May 25-Jun. 5, 2020, 15 pages.

* cited by examiner

*Primary Examiner* — Kevin C. Harper

(57) ABSTRACT

The disclosure relates to a communication technique that combines a 5G communication system for supporting a higher data rate after a 4G system with IoT technology, and a system thereof. The disclosure may be applied to intelligent services (e.g., smart home, smart building, smart city, smart car or connected car, healthcare, digital education, retail business, security and safety related services, and the like) based on 5G communication technology and IoT-related technology.

20 Claims, 18 Drawing Sheets

METHOD AND APPARATUS FOR TRANSMITTING UPLINK CHANNEL IN WIRELESS COMMUNICATION SYSTEM

CROSS-REFERENCE TO RELATED APPLICATION

This application is based on and claims priority under 35 U.S.C. § 119 to Korean Patent Application No. 10-2020-0132597, filed on Oct. 14, 2020, in the Korean Intellectual Property Office, the disclosures of which are herein incorporated by reference in their entireties.

BACKGROUND

1. Field

The disclosure relates to a wireless mobile communication system, and more particularly, to a method and apparatus for improving coverage in a process in which a terminal transmits information to a base station through an uplink channel.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network have been undertaken. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

In a communication or broadcast system, a link performance may be significantly degraded by various kinds of noise of a channel, a fading phenomenon, and inter-symbol interference (ISI). Therefore, in order to implement high-speed digital communication or broadcasting systems requiring high data throughput and reliability, such as next-generation mobile communication, digital broadcasting, and portable Internet, it is required to develop technology for overcoming noise, fading, and inter-symbol interference. As a part of research to overcome noise, and the like, recently, a research on error-correcting codes has been actively conducted as a method for increasing communication reliability by efficiently restoring information distortion.

SUMMARY

The disclosure relates to a wireless communication system, and to a method and device for improving coverage in a process in which a terminal transmits information to a base station through an uplink channel. Specifically, in a general wireless communication system, resource allocation is performed in units of a physical resource block (PRB), but resource allocation may be performed in an area smaller than one PRB on a frequency for the purpose of improving coverage. The disclosure relates to an operation of a base station and a terminal for allocating and transmitting resources in a frequency domain smaller than one PRB when transmitting a physical uplink shared channel (PUSCH).

According to an embodiment of the disclosure, a method performed by a terminal in a communication system includes receiving configuration information for a physical uplink shared channel (PUSCH) transmission from a base station; receiving, when resource allocation for a sub physical resource block (PRB) having the smaller number of subcarriers than the number of subcarriers of one PRB is indicated based on the configuration information, downlink control information (DCI) including resource allocation information on the sub PRB from the base station; and transmitting the PUSCH to the base station based on the resource allocation information, wherein the resource allocation information includes a field indicating any one set of a plurality of subcarrier sets corresponding to the number of subcarriers constituting the sub PRB.

According to an embodiment of the disclosure, a method performed by a base station in a communication system includes transmitting configuration information for a physical uplink shared channel (PUSCH) transmission to a terminal; transmitting, when resource allocation for a sub physical resource block (PRB) having the smaller number of subcarriers than the number of subcarriers of one PRB is indicated based on the configuration information, downlink control information (DCI) including resource allocation information on the sub PRB to the terminal; and receiving the PUSCH from the terminal based on the resource allocation information, wherein the resource allocation information includes a field indicating any one set of a plurality of subcarrier sets corresponding to the number of subcarriers constituting the sub PRB.

According to an embodiment of the disclosure, a terminal in a communication system includes a transceiver; and a controller configured to receive configuration information for physical uplink shared channel (PUSCH) transmission from a base station, to receive, when resource allocation for a sub physical resource block (PRB) having the smaller number of subcarriers than the number of subcarriers of one PRB is indicated based on the configuration information, downlink control information (DCI) including resource allocation information on the sub PRB from the base station, and to transmit the PUSCH to the base station based on the resource allocation information, wherein the resource allocation information includes a field indicating any one set of a plurality of subcarrier sets corresponding to the number of subcarriers constituting the sub PRB.

According to an embodiment of the disclosure, a base station in a communication system includes a transceiver; and a controller configured to transmit configuration information for a physical uplink shared channel (PUSCH) transmission to a terminal, to transmit, when resource allocation for a sub physical resource block (PRB) having the smaller number of subcarriers than the number of subcarriers of one PRB is indicated based on the configuration information, downlink control information (DCI) including resource allocation information on the sub PRB to the terminal, and to receive the PUSCH from the terminal based on the resource allocation information, wherein the resource allocation information includes a field indicating any one set of a plurality of subcarrier sets corresponding to the number of subcarriers constituting the sub PRB.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In the drawings, the same or similar reference numerals may be used for the same or similar components.

DETAILED DESCRIPTION

Figure 1:
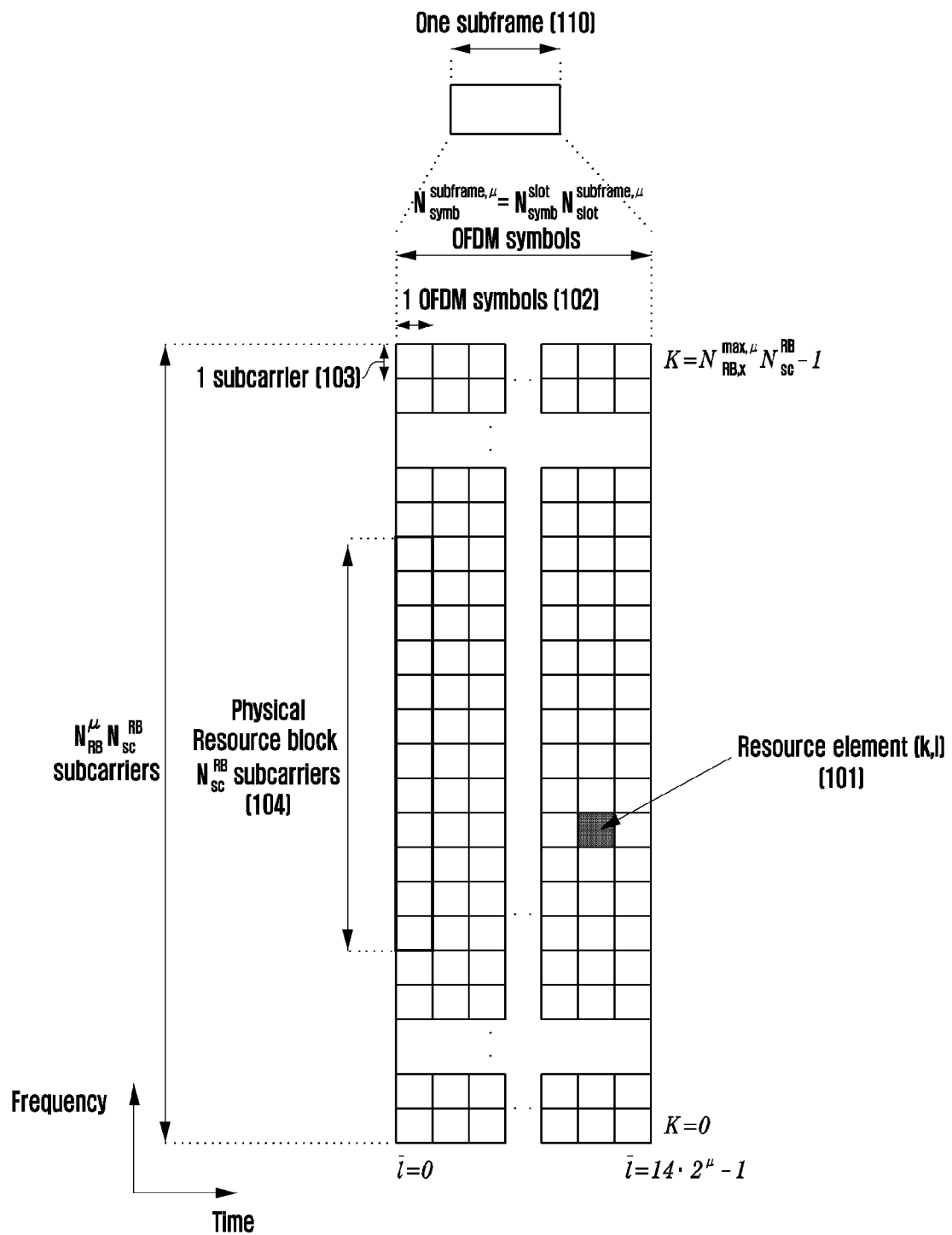
FIG. 1 is a diagram illustrating a basic structure of a time-frequency domain, which is a radio resource domain in which data or a control channel is transmitted in a 5G system according to an embodiment of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only this embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the message flow diagram block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuitry, data, databases, data structures, tables, arrays, and variables. Functions provided in the components and '-units' may be combined into the smaller number of components and '-units' or may be further separated into additional components and '-units'. Further, components and '-units' may be implemented to reproduce one or more CPUs in a device or secure multimedia card. Further, in an embodiment, '-unit' may include one or more processors.

In describing in detail the embodiments of the disclosure, a packet core (5G system, 5G core network, or next generation core (NG core)), which is a core network and a radio access network new RAN (NR) on a 5G mobile communication standard disclosed by 3rd generation partnership project long term evolution (3GPP), which is a mobile communication standardization organization are a main target, but the main gist of the disclosure is applicable to other communication systems having a similar technical background with slight modifications within the scope not significantly departing from the scope of the disclosure, which will be possible by determination of a person skilled in the art of the disclosure.

In the 5G system, in order to support network automation, a network data collection and analysis function (NWDAF), which is a network function that provides a function of analyzing and providing data collected in a 5G network, may be defined. The NWDAF may collect/store/analyze information from the 5G network and provide a result thereof to an unspecified network function (NF), and an analysis result thereof may be used independently in each NF.

Hereinafter, for convenience of description, some terms and names defined in the 3GPP standard (standards of 5G, NR, LTE, or similar systems) may be used. However, the disclosure is not limited by terms and names, and may be equally applied to systems conforming to other standards.

Further, a term for identifying an access node used in the following description, a term referring to a network entity, a term referring to messages, a term referring to an interface between network entities, and terms referring to various identification information and the like are exemplified for convenience of description. Therefore, the terms are not limited to terms used in the disclosure, and other terms referring to objects having equivalent technical meanings may be used.

In order to satisfy increases in demand for wireless data traffic now that a 4G communication system is commercially available, efforts are being made to develop an enhanced 5G communication system (NR, new radio). In order to achieve a high data transmission rate, the 5G communication system is designed to enable resources in a mmWave band (e.g., 28 GHz frequency band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, unlike LTE, the 5G communication system supports various subcarrier spacing such as 30 kHz, 60 kHz, and 120 kHz, including 15 kHz, a physical control channel uses polar coding, and a physical data channel uses a low density parity identify (LDPC). Further, CP-OFDM as well as DFT-S-OFDM is used as a waveform for uplink transmission. In LTE, hybrid ARQ (HARQ) retransmission in units of transport block (TB) is supported, whereas 5G may additionally support code block group (CBG)-based HARQ retransmission in which a plurality of CBs (code blocks) are bundled.

Further, in order to enhance networks in the 5G communication system, the technologies of an innovative small cell, advanced small cell, cloud radio access network (cloud RAN), ultra-dense network, device to device communication (D2D), wireless backhaul, vehicle to everything (V2X) network, cooperative communication, coordinated multi-points (CoMP), and interference cancellation are being developed.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network have been undertaken. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology. In this way, a plurality of services may be provided to a user in a communication system, and in order to provide such a plurality of services to a user, a method for providing each service within the same time period according to characteristics and a device using the same are required. Various services provided in the 5G communication system are being studied, and one of them is a service that satisfies requirements of low latency and high reliability.

In the case of data transmission through an uplink channel such as a physical uplink shared channel (PUSCH), the 5G NR system aims to provide improved coverage. Among various methods for enabling this, a method of utilizing a frequency domain may be considered. In the disclosure, a method of allocating and transmitting resources in a frequency domain smaller than one physical resource block (PRB) is considered. A PRB may be a basic unit of resource allocation for transmitting data, wherein one PRB may be configured with the $N_{sc}^{RB}$ number of resource elements (REs) on a frequency. In general transmission, data is transmitted by allocating resources to more than one PRB, but in the disclosure, a method in which resources are allocated and transmitted in a frequency domain smaller than one PRB is considered.

Specifically, a method in which resources are mapped to the $M_{sc}^{RU} < N_{sc}^{RB}$ ($M_{sc}^{RU} \geq 1$) number of REs (or carriers) on a frequency may be considered. In the disclosure, such a transmission method is referred to as a Sub-PRB resource allocation and transmission method. It should be noted, however, that these names may be replaced by other terms representing similar resource allocation and transmission methods. In the case of such Sub-PRB transmission, by using a frequency domain smaller than one PRB, additional power boosting may be considered, which may be a major factor in coverage improvement. However, in the case of Sub-PRB transmission, because a frequency domain smaller than one PRB is used, there may be a limitation in providing a high data rate. Accordingly, such Sub-PRB transmission may be used for services that do not require a high data rate. For example, a service such as a voice over Internet protocol (VoIP) may correspond thereto. The disclosure provides a resource mapping method for supporting Sub-PRB transmission, and methods for designing and transmitting a corresponding reference signal.

An embodiment of this specification is provided to support the above-described scenario, and provides a device and method for performing Sub-PRB transmission, which is a method of allocating resources in a frequency domain smaller than one PRB, in particular, during PUSCH transmission.

FIG. 1 is a diagram illustrating a basic structure of a time-frequency domain, which is a radio resource domain in which data or a control channel is transmitted in a 5G system according to an embodiment of the disclosure.

In FIG. 1, a horizontal axis represents a time domain, and a vertical axis represents a frequency domain. A basic unit of a resource in the time and frequency domains is an RE 101, which may be defined as one orthogonal frequency division multiplexing (OFDM) symbol 102 on the time axis and one subcarrier 103 on the frequency axis. In the frequency domain, the $N_{sc}^{RB}$ (e.g., 12) number of consecutive REs may constitute one PRB 104. In the time domain, the number $N_{symb}^{subframe,\mu} = N_{symb}^{slot} N_{slot}^{subframe,\mu}$ of OFDM symbols in one subframe may be determined by use subcarrier spacing. A more detailed description of the time domain will be described with reference to FIG. 2.

Figure 2:
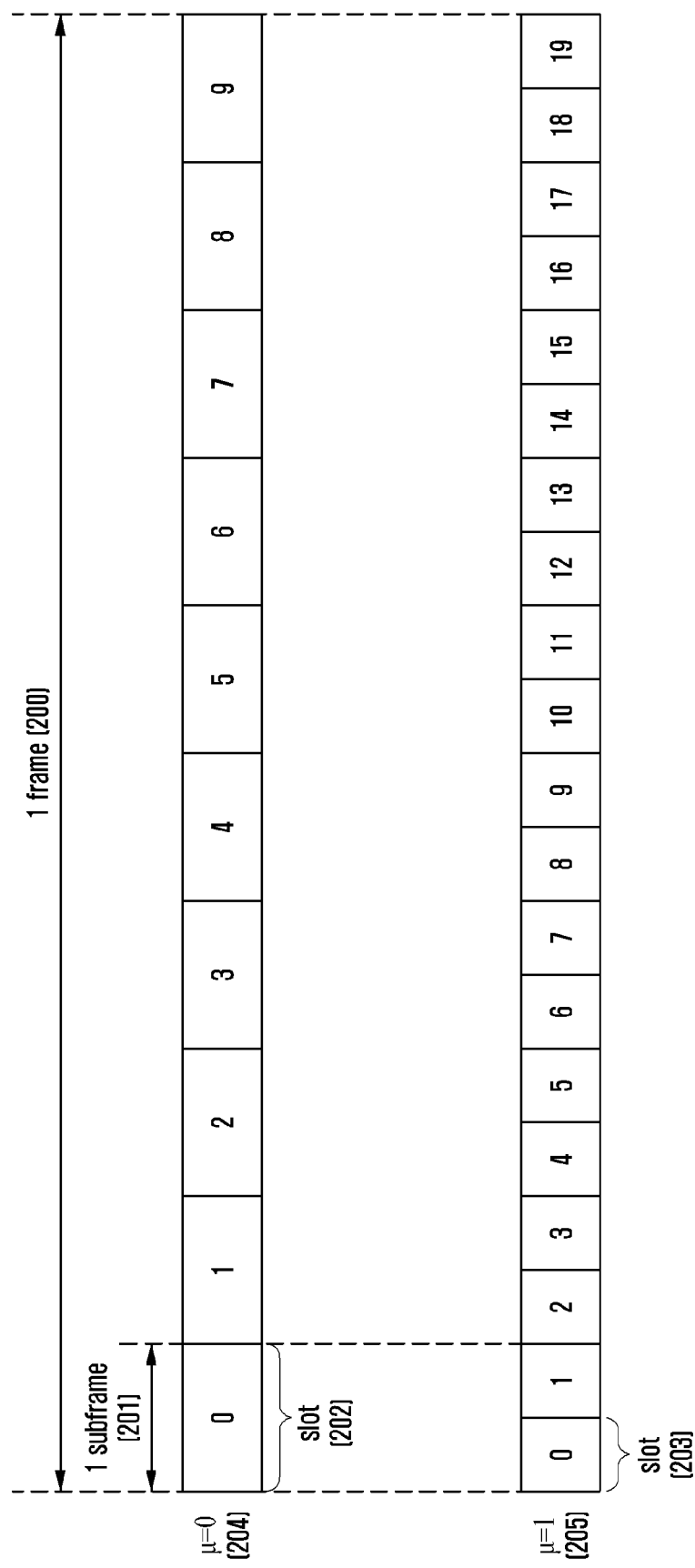
FIG. 2 is a diagram illustrating a structure of a time domain considered in a 5G system according to an embodiment of the disclosure.

FIG. 2 is a diagram illustrating a structure of a time domain considered in a 5G system according to an embodiment of the disclosure.

FIG. 2 illustrates an example of a structure of a frame 200, a subframe 201, and a slot 202. One frame 200 may be defined as 10 ms. One subframe 201 may be defined as 1 ms; thus, one frame 200 may be configured with total 10 subframes 201. One slot 202 and 203 may be defined as 14 OFDM symbols (i.e., the number $N_{symb}^{slot}$ of symbols per slot is 14). One subframe 201 may be configured with one or a plurality of slots 202 and 203, and the number of slots 202 and 203 per one subframe 201 may vary according to a configuration value μ (204, 205) for the subcarrier spacing. In an example of FIG. 2, a case of μ=0 (204) and a case of μ=1 (205) are illustrated as subcarrier spacing configuration values. When μ=0 (204), one subframe 201 may be configured with one slot 202, and when μ=1 (205), one subframe 201 may be configured with two slots 203. That is, the number $N_{slot}^{subframe,\mu}$ of slots per subframe may vary according to the configuration value μ for the subcarrier spacing, and accordingly, the number $N_{slot}^{frame,\mu}$ of slots per frame may vary. $N_{slot}^{frame,\mu}$ and $N_{slot}^{frame,\mu}$ according to each subcarrier spacing (SCS) configuration μ may be defined in Table 1.

TABLE 1

| μ | $N_{symb}^{slot}$ | $N_{slot}^{frame,\mu}$ | $N_{slot}^{subframe,\mu}$ |
|---|---|---|---|
| 0 (SCS = 15 KHz) | 14 | 10 | 1 |
| 1 (SCS = 30 KHz) | 14 | 20 | 2 |
| 2 (SCS = 60 KHz) | 14 | 40 | 4 |
| 3 (SCS = 120 KHz) | 14 | 80 | 8 |
| 4 (SCS = 240 KHz) | 14 | 160 | 16 |

Figure 3:
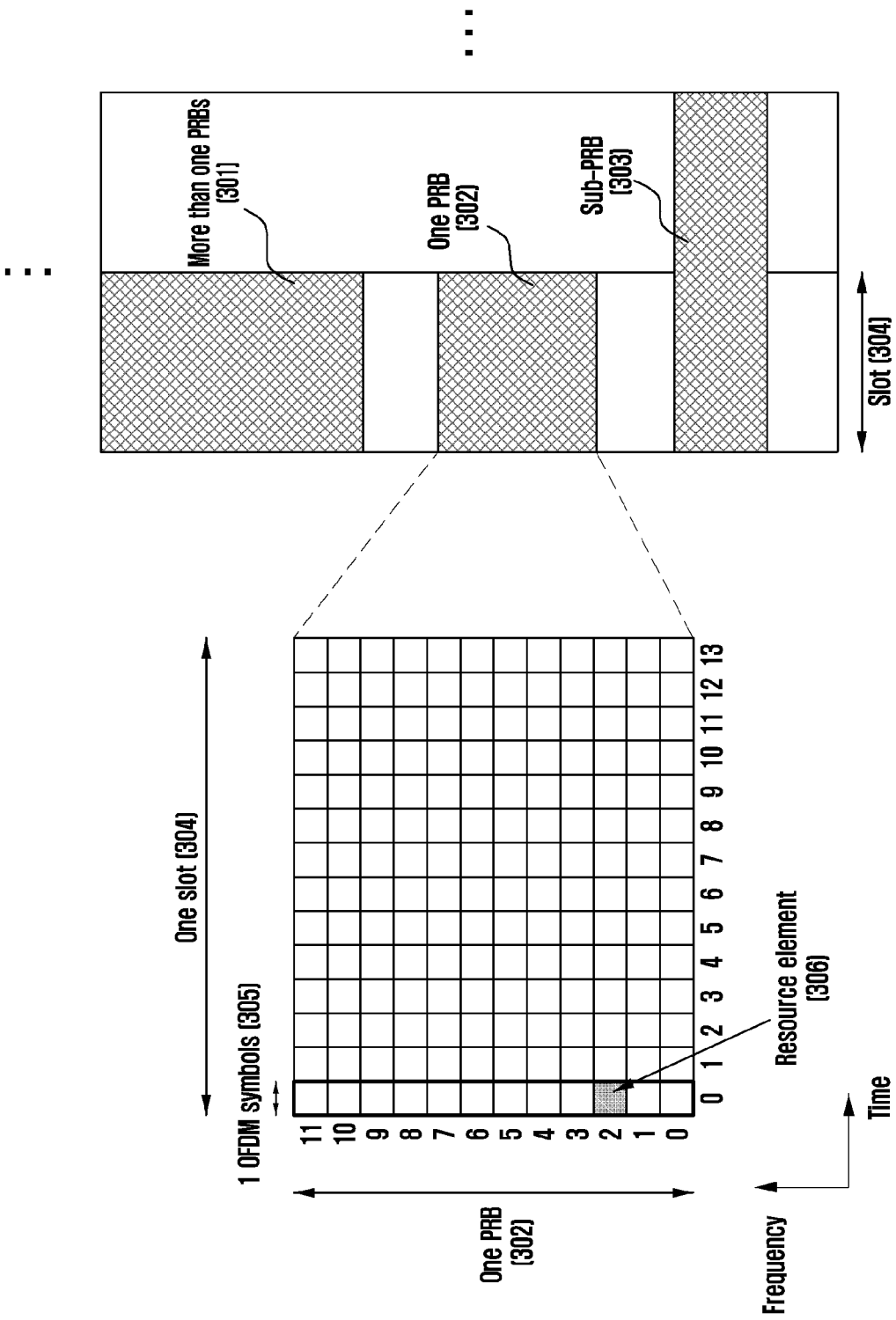
FIG. 3 is a diagram illustrating an example in which radio resources are allocated when a PUSCH is transmitted in a 5G system according to an embodiment of the disclosure.

FIG. 3 is a diagram illustrating an example in which radio resources are allocated for transmitting a physical uplink shared channel (PUSCH) in a 5G system according to an embodiment of the disclosure.

FIG. 3 illustrates a case in which more than one PRB 301 is allocated, a case in which one PRB 302 is allocated, and a case in which a Sub-PRB 303 is allocated for transmitting a PUSCH. As described above, in general PUSCH transmission, one PRB 302 or more than one PRB 301 are allocated and data is transmitted, but as in 303, in order to improve coverage, a frequency domain (Sub-PRB) smaller than one PRB may be allocated and data may be transmitted. In this case, whether a PUSCH is transmitted through the Sub-PRB may be configured through a higher layer. In other words, when Sub-PRB transmission is configured through a higher layer, the base station may perform Sub-PRB resource allocation, and the terminal may perform PUSCH transmission through the corresponding Sub-PRB. In this case, configuration information transmitted through the higher layer may include 1-bit information to indicate whether to transmit the Sub-PRB. Alternatively, when Sub-PRB related information is included in the configuration information, Sub-PRB transmission may be indicated. Further, the base station may indicate resource allocation for Sub-PRB transmission to the terminal through downlink control information (DCI). A detailed description thereof refers to Embodiment 2.

Alternatively, resource allocation information to be used for Sub-PRB transmission may be included in configuration information transmitted through a higher layer, and the terminal may perform PUSCH transmission using the corresponding resource. Alternatively, as described above, whether to transmit the Sub-PRB may be indicated through 1-bit information, and when Sub-PRB transmission is indicated, the terminal may transmit the PUSCH using resource allocation information included in the configuration information.

Alternatively, at least one information on a resource to be used for Sub-PRB transmission may be included in the configuration information transmitted through the higher layer. In this case, the information on the resource may be included, for example, in the form of a list. The base station may include information indicating any one of the at least one resource in DCI in order to configure Sub-PRB transmission. The number of bits of information included in the DCI may be determined according to the number of information on resources configured through a higher layer. Even when such a method is used, it is obvious that information included in the DCI disclosed in Embodiment 2 may be equally used.

Referring to FIG. 3, time and frequency mapping for a case in which one PRB is allocated for transmitting a PUSCH is illustrated at 302. According to 302, one PRB configured with 12 REs 306 in the frequency domain and one slot 304 defined to 14 OFDM symbols 305 in the time domain are illustrated. Accordingly, when more than one PRB is allocated, as in 301 for transmitting a PUSCH, more resources may be allocated. Alternatively, in the case of Sub-PRB transmission in which resources are allocated and transmitted in a frequency domain smaller than one PRB as in 303 during PUSCH transmission, because resource mapping on a frequency is limited, a transport block size (TBS) may be very small. Accordingly, as illustrated in 303, in order to maintain a TBS corresponding to at least one PRB transmission, data may be mapped to more than one slot on a time.

For example, when one PRB is configured with the $N_{sc}^{RB}$ number of REs (or carriers) and Sub-PRB transmission is configured with the $M_{sc}^{RU} < N_{sc}^{RB}$ ($M_{sc}^{RU} \geq 1$) number of REs on a frequency, data may be mapped to the $M_{slots}^{UL} = N_{sc}^{RB} / M_{sc}^{RU}$ number of slots on a time. Specifically, as in 303, when $N_{sc}^{RB} = 12$ and $M_{sc}^{RU} = 6$, Sub-PRB transmission may be performed in two slots. A detailed description on additional time resource mapping during Sub-PRB transmission refer to Embodiment 2. As described above, when transmission is performed in a frequency domain smaller than one PRB through Sub-PRB resource allocation, additional power boosting may be considered in consideration of a frequency domain not used for transmission. A detailed support method thereof refers to Embodiment 3.

As described with reference to FIG. 3, unlike general PUSCH transmission, when Sub-PRB transmission is performed, a resource unit (RU) thereof needs to be defined. First, assuming that resources are allocated to the $M_{sc}^{RU}$ number of REs on a frequency during Sub-PRB transmission, supported $M_{sc}^{RU}$ values and $M_{slots}^{UL}$ values may be defined. It should be noted that, in the disclosure, the $M_{sc}^{RU}$ values and the $M_{slots}^{UL}$ values defined during Sub-PRB transmission are not limited to specific values. Table 2 illustrates an example of a parameter and a corresponding value for a resource unit that may be considered for Sub-PRB transmission during PUSCH transmission in the 5G NR system.

In Table 2, $M_{sc}^{UL}$ may correspond to an M value of an M-point invert discrete Fourier transform (IDFT) applied to discrete Fourier transform spread OFDM (DFT-S-OFDM) during Sub-PRB transmission. Referring to Table 2, as $M_{sc}^{RU}$ values, 6, 4, 3, and 2 were considered. However, in the disclosure, the $M_{sc}^{RU}$ values supportable for Sub-PRB transmission are not limited to the values presented in Table 2. For example, only some of the $M_{sc}^{RU}$ values considered in Table 2 may be considered or other values may be considered in addition to values disclosed in Table 2. Further, the $M_{sc}^{RU}$ values in Table 2 may be considered for all modulation degrees supported for Sub-PRB transmission. Alternatively, a supported modulation degree for a specific $M_{sc}^{RU}$ value may be determined.

As illustrated in Table 2, when 6, 4, 3, and 2 are considered as $M_{sc}^{RU}$ values, the $M_{slots}^{UL}$ values may be determined as values such as $2 \cdot 2^\mu$, $3 \cdot 2^\mu$, $4 \cdot 2^\mu 0$ and $6 \cdot 2^\mu$, respectively in consideration of the supported subcarrier spacing. Here, μ is a parameter indicating subcarrier spacing and refers to Table 1. In the disclosure, $M_{slots}^{UL}$ values supportable for Sub-PRB transmission are not limited to the values illustrated in Table 2. For example, only some of the $M_{slots}^{UL}$ values considered in Table 2 may be considered or other values may be considered in addition to values disclosed in Table 2. For example, the $M_{slots}^{UL}$ value may be determined to 1 slot ($M_{slots}^{UL}=1$), which is a basic unit of the existing time domain scheduling. A detailed description on where the $M_{sc}^{RU}$ number of REs presented in Table 2 may be mapped on a frequency among the $N_{sc}^{RB}$ number of REs refer to Embodiment 1.

TABLE 2

| $M_{sc}^{UL}$ | $M_{sc}^{RU}$ | $M_{slots}^{UL}$ |
|---|---|---|
| 12 | 2 | $6 \cdot 2^\mu$ |
|  | 3 | $4 \cdot 2^\mu$ |
|  | 4 | $3 \cdot 2^\mu$ |
|  | 6 | $2 \cdot 2^\mu$ |

Figure 4:
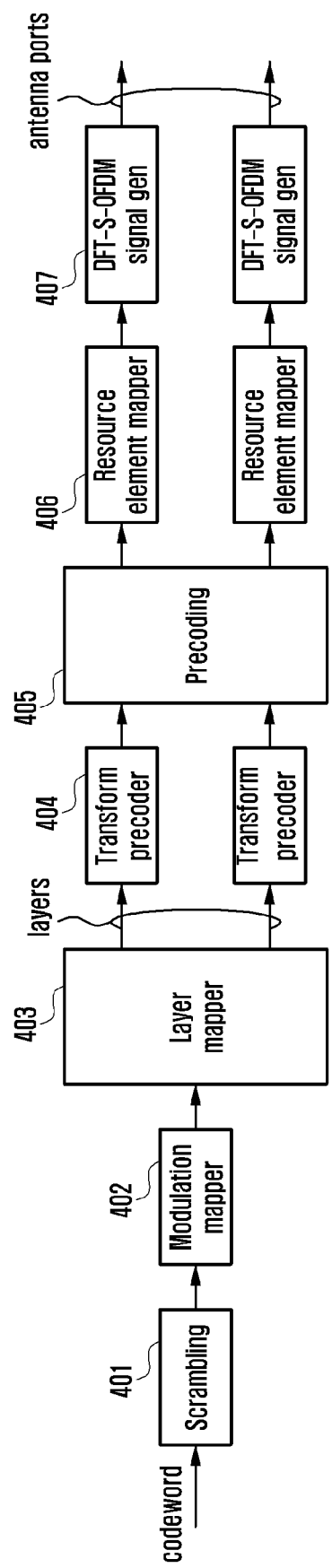
FIG. 4 is a diagram illustrating an example of a PUSCH transmission procedure based on discrete Fourier transform spread OFDM (DFT-S-OFDM) in a 5G system according to an embodiment of the disclosure.

FIG. 4 is a diagram illustrating an example of a PUSCH transmission procedure based on DFT-S-OFDM in a 5G system according to an embodiment of the disclosure.

In the 5G NR system, during uplink transmission, two waveforms such as cyclic-prefix OFDM (CP-OFDM) and DFT-S-OFDM are supported. It should be noted that the disclosure focuses on a DFT-S-OFDM based Sub-PRB transmission method. However, it should be noted that a waveform used for Sub-PRB transmission is not limited to DFT-S-OFDM in the disclosure.

Referring to FIG. 4, a procedure in which PUSCH transmission data is transformed into a codeword to be scrambled (401) after channel encoding is illustrated. Unlike the LTE system, in the 5G NR system, one codeword may be used up to 4 layer transmission. In the case of PUSCH transmission, because only up to 4 layer transmission per terminal is considered for uplink transmission, only one codeword may be assumed, as illustrated in FIG. 4.

Thereafter, referring to FIG. 4, a procedure in which the scrambled (401) uplink signal is modulated (402) is illustrated. Because coverage improvement is considered as a main scenario during Sub-PRB transmission, use of a low modulation degree such as π/2-BPSK or QPSK may be considered.

Thereafter, referring to FIG. 4, a procedure of layer mapping (403) the modulated (402) uplink signal is illustrated. When the number of transport layers is greater than one, the modulated signal 402 may be mapped to a plurality of layers and transmitted.

Thereafter, referring to FIG. 4, a procedure of transform precoding (404) the layer mapped (403) uplink signal is illustrated. The corresponding process may be represented by Equation 1, and may include a process of performing N-point DFT. Detailed parameters for Equation 1 refer to 3GPP TS 38.211.

[Equation 1]

$$y_{l,:}^{(0)}\left(l \cdot M_{SC}^{PUSCH} + k\right) = \frac{1}{\sqrt{M_{SC}^{PUSCH}}} \sum_{i=0}^{M_{SC}^{PUSCH}-1} \tilde{x}^{(0)}\left(lM_{sc}^{PUSCH} + i\right)e^{-j\frac{2\pi i k}{M_{SC}^{PUSCH}}}$$

When resources are allocated to more than one PRB, it may be configured to $M_{SC}^{PUSCH}=M_{RB}^{PUSCH} \cdot N_{SC}^{RB}$ in Equation 1. However, it may be configured to $M_{SC}^{PUSCH}=M_{sc}^{RU}$ in Equation 1 during Sub-PRB transmission.

Thereafter, referring to FIG. 4, a procedure of precoding (405) a transform precoded (404) uplink signal is illustrated. During uplink transmission, unlike a data signal, a demodulation reference signal (DMRS) may be mapped to a resource before precoding 405 is performed. A detailed description of a DMRS mapped 406 to resources during Sub-PRB transmission refers to Embodiment 1.

Thereafter, referring to FIG. 4, a procedure of mapping (406) a precoded (405) uplink signal to a resource is illustrated. A detailed description of mapping (406) an uplink data signal to a resource during Sub-PRB transmission refers to Embodiment 1.

Thereafter, referring to FIG. 4, a procedure of generating (407) the uplink signal mapped (406) to the resource into a DFT-S-OFDM signal is illustrated. Here, a procedure of generating into the DFT-S-OFDM signal may be referred to as a procedure of generating into a single carrier OFDM (SC-OFDM) signal. The corresponding process may be represented by Equation 2, and may include a process of performing M-point IDFT and adding a cyclic prefix (CP). Detailed parameters for Equation 2 refer to 3GPP TS 38.211.

[Equation 2]

$$s_l^{(p,\mu)}(t) = \begin{cases} \bar{s}_l^{(p,\mu)}(t) & t_{start,l}^\mu \leq t < t_{start,l}^\mu + T_{symb,l}^\mu \\ 0 & \text{otherwise} \end{cases}$$

$$\bar{s}_l^{(p,\mu)}(t) = \sum_{k=0}^{N_{grid,x}^{size,\mu}N_{sc}^{RB}-1} a_{k,l}^{(p,\mu)} e^{j2\pi\left(k+k_0^\mu-N_{grid,x}^{size,\mu}N_{sc}^{RB}/2\right)\Delta f\left(t-N_{CP,l}^\mu T_c - t_{start,l}^\mu\right)}$$

During Sub-PRB transmission, in Equation 2 $N_{grid,x}^{size,\mu}N_{sc}^{RB}$ may be replaced with $M_{sc}^{UL}$. A value of $M_{sc}^{UL}$ refers to Table 2. When a modulation degree of π/2-BPSK is used, an equation different from Equation 2 may be used during Sub-PRB transmission.

Hereinafter, a Sub-PRB transmission method during PUSCH transmission is presented through a detailed embodiment. In the disclosure, the following embodiments may be used in combination with each other.

Embodiment 1

Embodiment 1 provides various methods in which PUSCH data and reference signals are mapped to time and frequency resources when resources are allocated in units of Sub-PRB. As described above, when transmitting a PUSCH through a Sub-PRB, PUSCH data resources may be allocated to the $M_{sc}^{RU}$ ($M_{sc}^{RU} < N_{sc}^{RB}$, $M_{sc}^{RU} \geq 1$) number of REs among the $N_{sc}^{RB}$ number of REs defined in a frequency in one PRB. In the disclosure, a position on a frequency of an RE to which a Sub-PRB is allocated and transmitted may correspond to a carrier.

Figure 5:
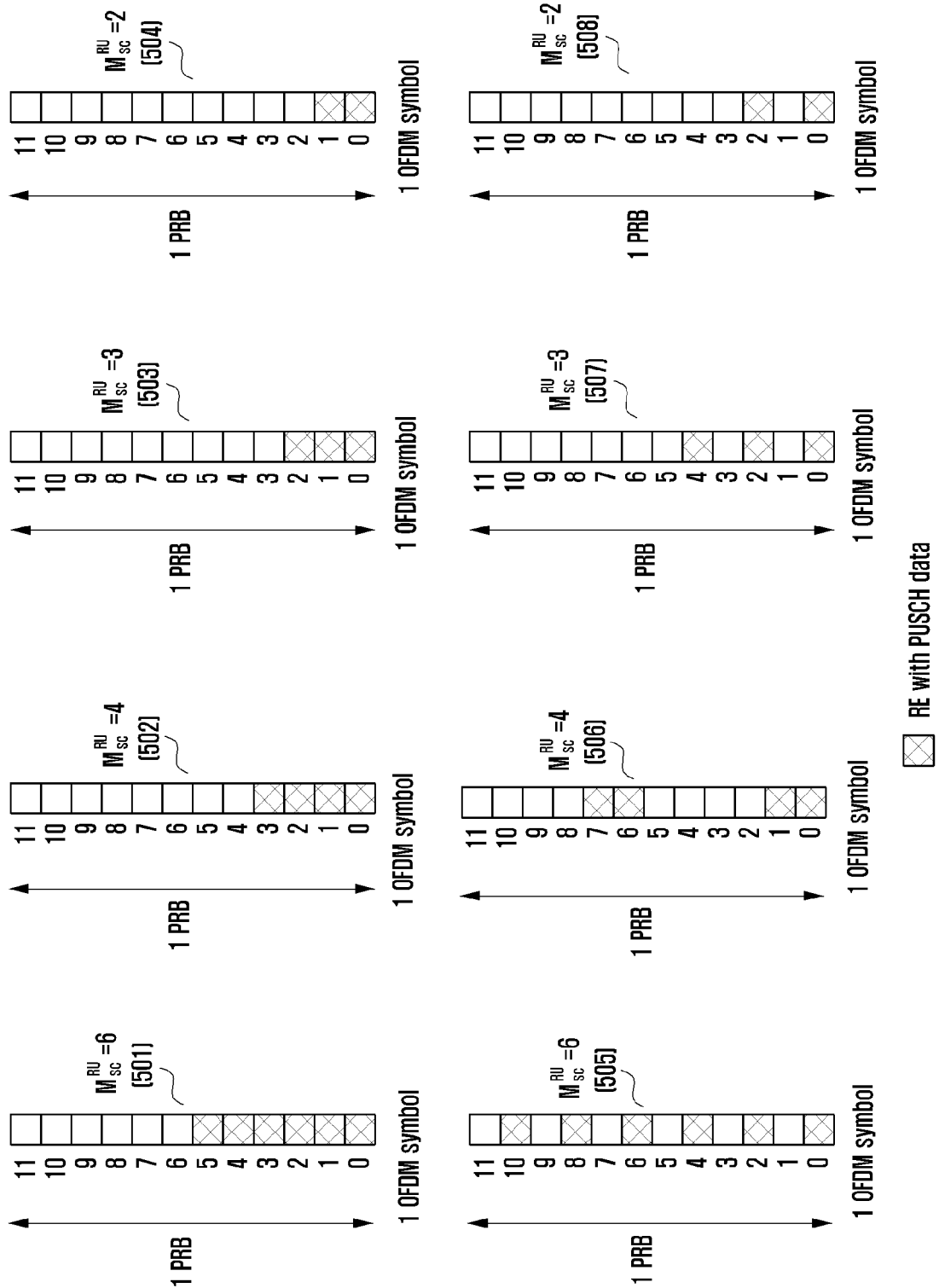
FIG. 5 is a diagram illustrating a method in which PUSCH data is mapped to a frequency domain during Sub-PRB transmission according to an embodiment of the disclosure.

In this embodiment, various methods in which the $M_{sc}^{RU}$ number of REs are mapped onto a frequency during Sub-PRB transmission are presented with reference to FIG. 5. Further, a PUSCH DMRS may be transmitted in the same carrier as that of PUSCH data on a frequency and in a different OFDM symbol on a time. Alternatively, a method of transmitting a PUSCH DMRS in a carrier that is not the same as that of PUSCH data on a frequency may be considered. Accordingly, in this embodiment, various methods in which a PUSCH DMRS is mapped onto a frequency during Sub-PRB transmission are presented with reference to FIG. 6.

When Sub-PRB transmission is performed in the $M_{sc}^{RU}$ number of REs on a frequency, data may be mapped over the $M_{slots}^{UL}$ number of slots on a time. In the case of Sub-PRB transmission, because resource mapping is limited on a frequency, when a large number of DMRS symbols are transmitted in one slot on a time, data mapping and transmission may be limited. Further, when data is transmitted through a plurality of slots, channel estimation may be performed by DMRS time domain bundling of different slots on the time axis; thus, transmission of a large number of DMRS symbols in one slot is unnecessary. In consideration of this point, in the following embodiment, a method of configuring a DMRS pattern for PUSCH data during Sub-PRB transmission is presented.

First, there is provided a method in which PUSCH data resources are mapped to the $M_{sc}^{RU}$ number of REs among the $N_{sc}^{RB}$ number of REs defined on a frequency in one PRB during Sub-PRB transmission.

FIG. 5 is a diagram illustrating a method in which PUSCH data is mapped to a frequency domain during Sub-PRB transmission according to an embodiment of the disclosure.

Referring to FIG. 5, during Sub-PRB transmission, PUSCH data may be mapped in a consecutive method or a non-consecutive method in the frequency domain. Specifically, 501 to 504 illustrate a case in which PUSCH data is consecutively mapped to the frequency domain during Sub-PRB transmission.

According to 501 of FIG. 5, in the case of $M_{sc}^{RU}=6$, PUSCH data was mapped to 6 REs consecutively from a low carrier index on a frequency. According to 502 of FIG. 5, in the case of $M_{sc}^{RU}=4$, PUSCH data was mapped to four REs consecutively from a low carrier index on a frequency. According to 503 of FIG. 5, in the case of $M_{sc}^{RU}=3$, PUSCH data was mapped to three REs consecutively from a low carrier index on a frequency. According to 504 of FIG. 5, in the case of $M_{sc}^{RU}=2$, PUSCH data was mapped to two REs consecutively from a low carrier index on a frequency.

That is, in 501 to 504, when PUSCH data is consecutively mapped to the frequency domain during Sub-PRB transmission, a case in which PUSCH data is mapped to the $M_{sc}^{RU}$ number of REs consecutively from a low carrier index is illustrated. In this case, $M_{sc}^{RU}$ may be configured from the base station through a higher layer or through DCI. Alternatively, as illustrated in Table 2, available $M_{sc}^{RU}$ may be predetermined, and the base station may configure index information corresponding to the above $M_{sc}^{RU}$ to the terminal through a higher layer or DCI.

Alternatively, the base station may configure a list of available $M_{sc}^{RU}$ values through a higher layer, and configure a value of $M_{sc}^{RU}$ to be used for PUSCH transmission through DCI.

However, in the disclosure, a case in which PUSCH data is mapped in a consecutive method in the frequency domain during Sub-PRB transmission is not limited to methods presented in 501 to 504. That is, in addition to a method in which PUSCH data is mapped to the RE consecutively from a lowest carrier index on a frequency, a method in which PUSCH data is mapped to the RE consecutively from a predetermined carrier index or in which PUSCH data is mapped to the RE consecutively from a carrier index determined by a predetermined method may be used.

Alternatively, 505 to 508 illustrate a case in which PUSCH data is mapped to the frequency domain in a non-consecutive method during Sub-PRB transmission. According to 505 of FIG. 5, in the case of $M_{sc}^{RU}=6$, PUSCH data was mapped to 6 REs non-consecutively from a low carrier index on a frequency. According to 506 of FIG. 5, in the case of $M_{sc}^{RU}=4$, PUSCH data was mapped to 4 REs non-consecutively from a low carrier index on a frequency. According to 507 of FIG. 5, in the case of $M_{sc}^{RU}=3$, PUSCH data was mapped to three REs non-consecutively from a low carrier index on a frequency. According to 508 of FIG. 5, in the case of $M_{sc}^{RU}=2$, PUSCH data was mapped to two REs non-consecutively from a low carrier index on a frequency. The above-described method may be used as a method of configuring $M_{sc}^{RU}$, and a detailed description thereof will be omitted.

In the disclosure, a case in which PUSCH data is mapped to the frequency domain in a non-consecutive method during Sub-PRB transmission is not limited to the methods presented in 505 to 508. That is, various embodiments in which PUSCH data is mapped to the frequency domain in a non-consecutive method may be considered.

Next, there is provided a method in which a PUSCH DMRS is mapped when PUSCH data resources are mapped to the $M_{sc}^{RU} < N_{sc}^{RB}$ ($M_{sc}^{RU} \geq 1$) number of REs among the $N_{sc}^{RU}$ number of REs defined on a frequency in one PRB during Sub-PRB transmission.

Figure 6A:
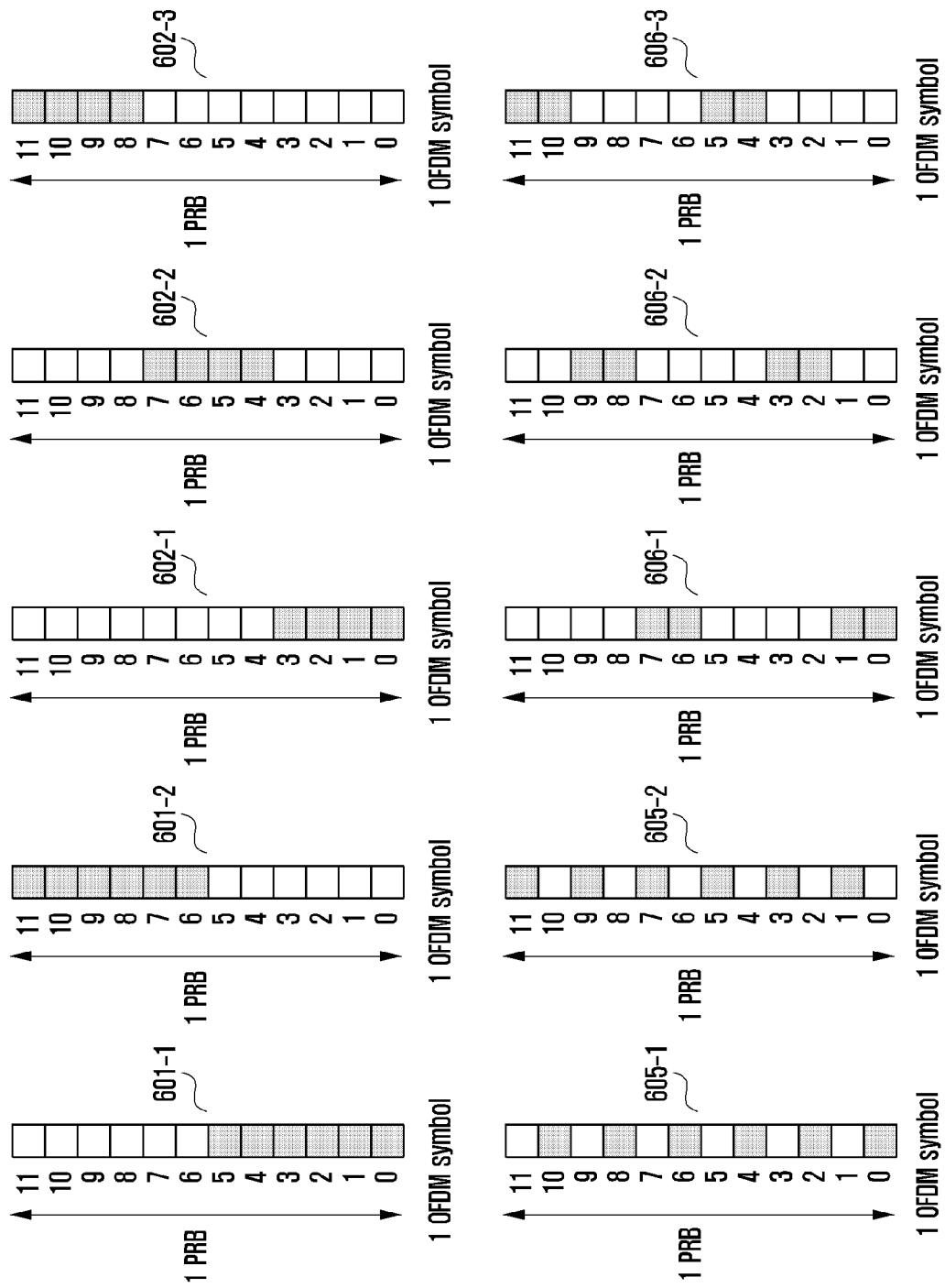
FIG. 6A is a diagram illustrating a method in which a PUSCH DMRS is mapped to a frequency domain during Sub-PRB transmission according to an embodiment of the disclosure.
Figure 6B:
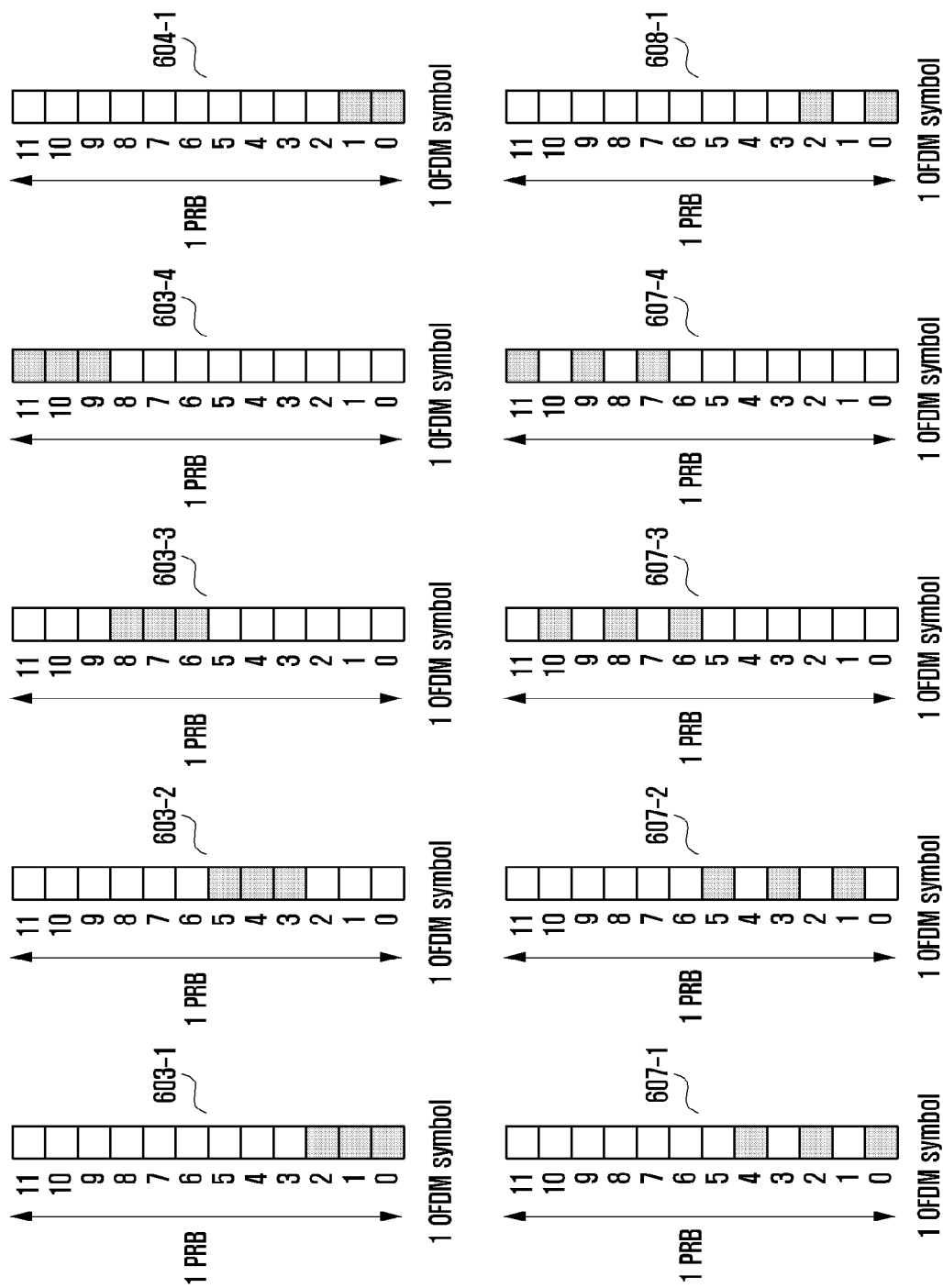
FIG. 6B is a diagram illustrating a method in which a PUSCH DMRS is mapped to a frequency domain during Sub-PRB transmission according to an embodiment of the disclosure.
Figure 6C:
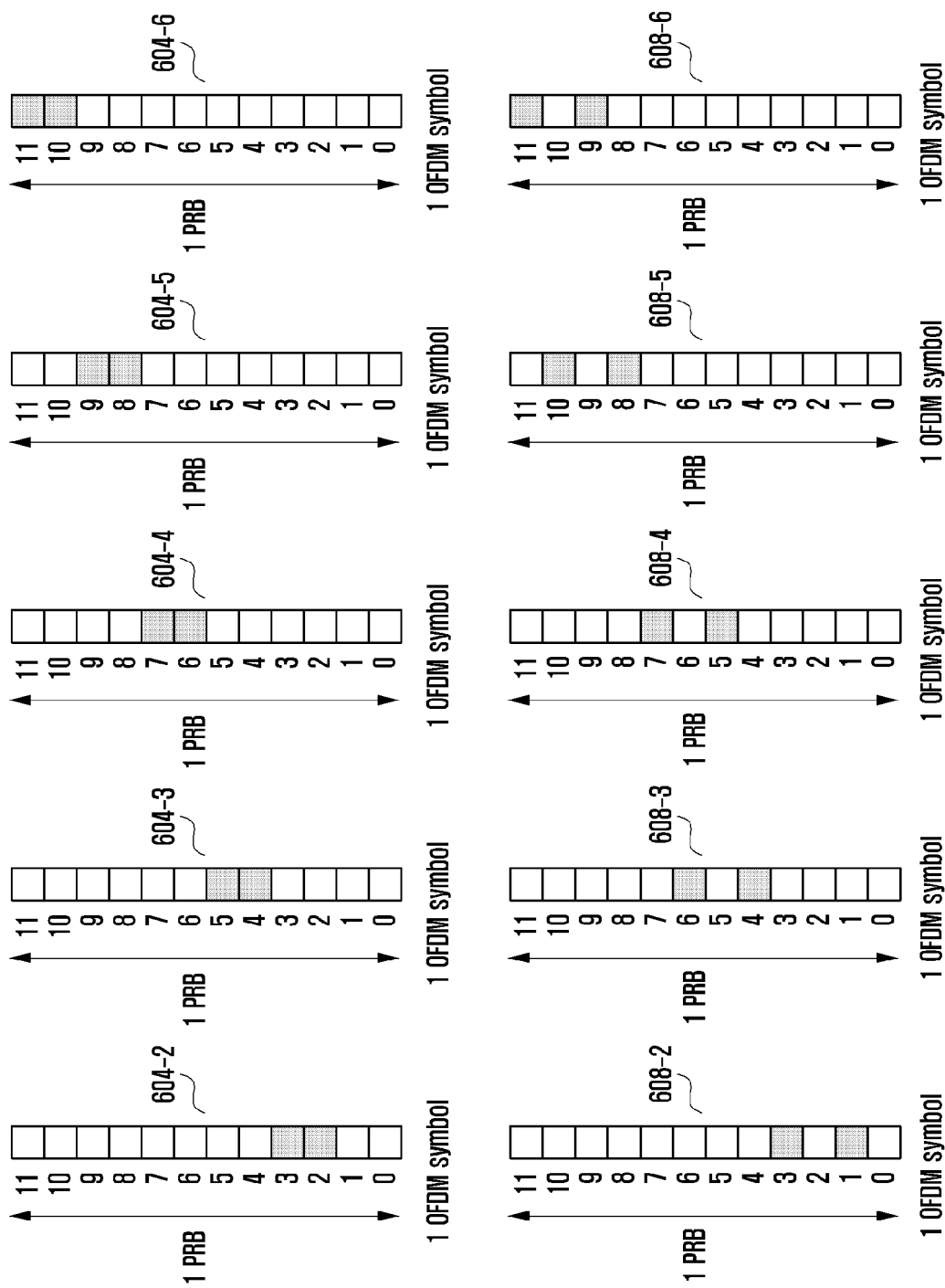
FIG. 6C is a diagram illustrating a method in which a PUSCH DMRS is mapped to a frequency domain during Sub-PRB transmission according to an embodiment of the disclosure.

FIGS. 6A, 6B, and 6C are diagrams illustrating a method in which a PUSCH DMRS is mapped to a frequency domain during Sub-PRB transmission according to an embodiment of the disclosure.

FIGS. 6A, 6B, and 6C illustrate a method in which a PUSCH DMRS is mapped to the frequency domain in a consecutive method or a non-consecutive method during Sub-PRB transmission.

Specifically, 601-1, 601-2, 602-1, 602-2, and 602-3 of FIG. 6A, 603-1, 603-2, 603-3, 603-4, and 604-1 of FIG. 6B, and 604-2, 604-3, 604-4, 604-5, and 604-6 of FIG. 6C illustrate a case in which the PUSCH DMRS is mapped in a consecutive method to the frequency domain during Sub-PRB transmission.

According to 601-1 and 601-2, the PUSCH DMRS was mapped to 6 REs consecutively on a frequency. According to 602-1, 602-2, and 602-3, the PUSCH DMRS was mapped to four REs consecutively on a frequency. According to 603-1, 603-2, 603-3, and 603-4, the PUSCH DMRS was mapped to three REs consecutively on a frequency. According to 604-1, 604-2, 604-3, 604-4, 604-5, and 604-6, the PUSCH DMRS was mapped to two REs consecutively on a frequency. In the disclosure, a case in which the PUSCH DMRS is mapped in a consecutive method in the frequency domain during Sub-PRB transmission is not limited to methods presented above.

Alternatively, 605-1, 605-2, 606-1, 606-2, and 606-3 of FIG. 6A, 607-1, 607-2, 607-3, 607-4, and 608-1 of FIG. 6B, and 608-2, 608-3, 608-4, 608-5, and 608-6 of FIG. 6C illustrate a case in which a PUSCH DMRS is mapped to the frequency domain in a non-consecutive method during Sub-PRB transmission.

According to 605-1 and 605-2, a PUSCH DMRS was mapped to 6 REs non-consecutively on a frequency. It should be noted that the DMRS pattern illustrated in 605-1 and 605-2 is a DMRS pattern on a frequency supported in the 5G NR system (DM-RS configuration type 1).

According to 606-1, 606-2, and 606-3, a PUSCH DMRS was mapped to 4 REs non-consecutively on a frequency. It should be noted that the DMRS pattern illustrated in 606-1, 606-2, and 606-3 is a DMRS pattern on a frequency supported in the 5G NR system (DM-RS configuration type 2).

According to 607-1, 607-2, 607-3, and 607-4, a PUSCH DMRS was mapped to three REs non-consecutively on a frequency.

According to 608-1, 608-2, 608-3, 608-4, 608-5, and 608-6, a PUSCH DMRS was mapped to two REs non-consecutively on a frequency. In the disclosure, a case in which the PUSCH DMRS is mapped to the frequency domain in a non-consecutive method during Sub-PRB transmission is not limited to the methods presented above.

Figure 7:
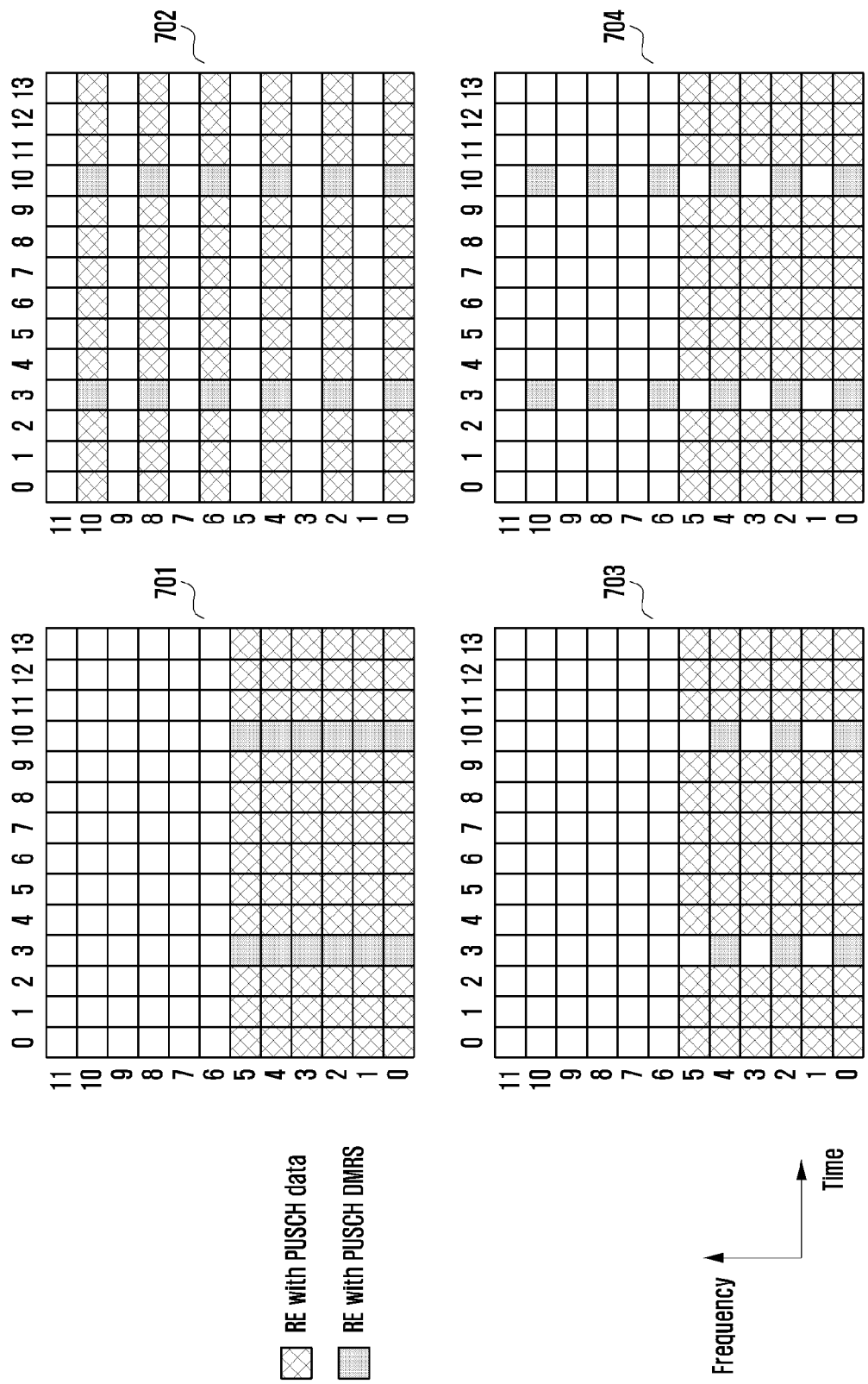
FIG. 7 is a diagram illustrating a method in which a PUSCH data resource and a DMRS are mapped to time and frequency domains during Sub-PRB transmission according to an embodiment of the disclosure.

FIG. 7 is a diagram illustrating a method in which a PUSCH data resource and a DMRS are mapped to time and frequency domains during Sub-PRB transmission according to an embodiment of the disclosure.

Referring to FIG. 7, a PUSCH DMRS may be transmitted in the same carrier on a frequency as PUSCH data and in different OFDM symbols on a time. Alternatively, a method of transmitting a PUSCH DMRS in a carrier that is not the same as that of PUSCH data on a frequency may be considered.

Specifically, 701 to 702 illustrate a case in which a PUSCH DMRS is transmitted in the same carrier on a frequency as PUSCH data and in different OFDM symbols on a time during Sub-PRB transmission.

According to 701, in the case of $M_{sc}^{RU}=6$, a case in which PUSCH data is mapped to 6 REs consecutively from a low carrier index on a frequency is illustrated. The PUSCH DMRS was mapped to the same carrier on a frequency as PUSCH data and to different OFDM symbols on a time.

According to 702, in the case of $M_{sc}^{RU}=6$, a case in which PUSCH data is mapped to 6 REs non-consecutively from a low carrier index on a frequency is illustrated. The PUSCH DMRS was mapped to the same carrier as the PUSCH data on a frequency and to different OFDM symbols on a time.

Alternatively, 703 to 704 illustrate a method in which a PUSCH DMRS is transmitted in a carrier that is not the same as that of PUSCH data on a frequency during Sub-PRB transmission.

According to 703 and 704, in the case of $M_{sc}^{RU}=6$, a case in which PUSCH data is mapped to 6 REs consecutively from a low carrier index on a frequency is illustrated. However, a case in which the PUSCH DMRS is mapped to a carrier that is not the same as that of PUSCH data on a frequency is illustrated.

In the disclosure, a method in which the PUSCH data resource and the DMRS are mapped to the time and frequency domains during Sub-PRB transmission is not limited to the methods presented in 701 to 704. It should be noted that in a method of mapping PUSCH data resources and DMRSs to the time and frequency domains during Sub-PRB transmission, PUSCH data mapping presented through FIG. 5 and the PUSCH DMRS frequency axis pattern presented through FIGS. 6A to 6C may be mapped to different OFDM symbols on a time to be applied in various combinations.

Hereinafter, a method of configuring a DMRS pattern for PUSCH data during Sub-PRB transmission is provided. As described above, when Sub-PRB transmission is performed in the $M_{sc}^{RU}$ number of REs on a frequency, data may be mapped over the $M_{slots}^{UL}$ number of slots on a time. In the case of Sub-PRB transmission, because resource mapping is limited on a frequency, data mapping and transmission may be limited when a large number of DMRS symbols are transmitted in one slot on a time. Further, when data is transmitted through a plurality of slots, channel estimation may be performed by bundling DMRSs of different slots in the time axis; thus, transmission of a large number of DMRS symbols in one slot is unnecessary.

In the case of general PUSCH transmission, in order to increase accuracy of channel estimation on the time axis due to the high Doppler effect, a DMRS may be transmitted from 4 symbols in one slot. Specifically, the DMRS may be transmitted from one symbol in one slot through the higher layer configuration or may be transmitted from different 2, 3, or 4 symbols. However, due to the reasons described above, a large number of DMRS symbols are unnecessary in one slot during Sub-PRB transmission. During Sub-PRB transmission, the following method may be used as a method of configuring a DMRS pattern for PUSCH data. As described above, whether to transmit the Sub-PRB may be configured by a higher layer.

Method 1: When the DMRS pattern is configured through the higher layer, only one or two different DMRS symbols may be configured in the slot.

Method 2: The terminal does not expect that more than two DMRS symbols are configured in a slot.

Method 3: The DMRS position may be fixed to one or two symbols in the slot.

When the DMRS position is fixed to one symbol in the slot, the corresponding symbol may correspond to a 4th OFDM symbol or a 7th OFDM symbol. However, the embodiment of the disclosure is not limited thereto, and the DMRS symbol may be fixed to a position of one symbol of all ODFM symbols in the slot.

When the DMRS position is fixed to two symbols in the slot, the corresponding symbols may correspond to the 4th and 11th OFDM symbols. However, the embodiment of the disclosure is not limited thereto, and the DMRS symbol may be fixed at positions of two symbols of all ODFM symbols in the slot.

Figure 8A:
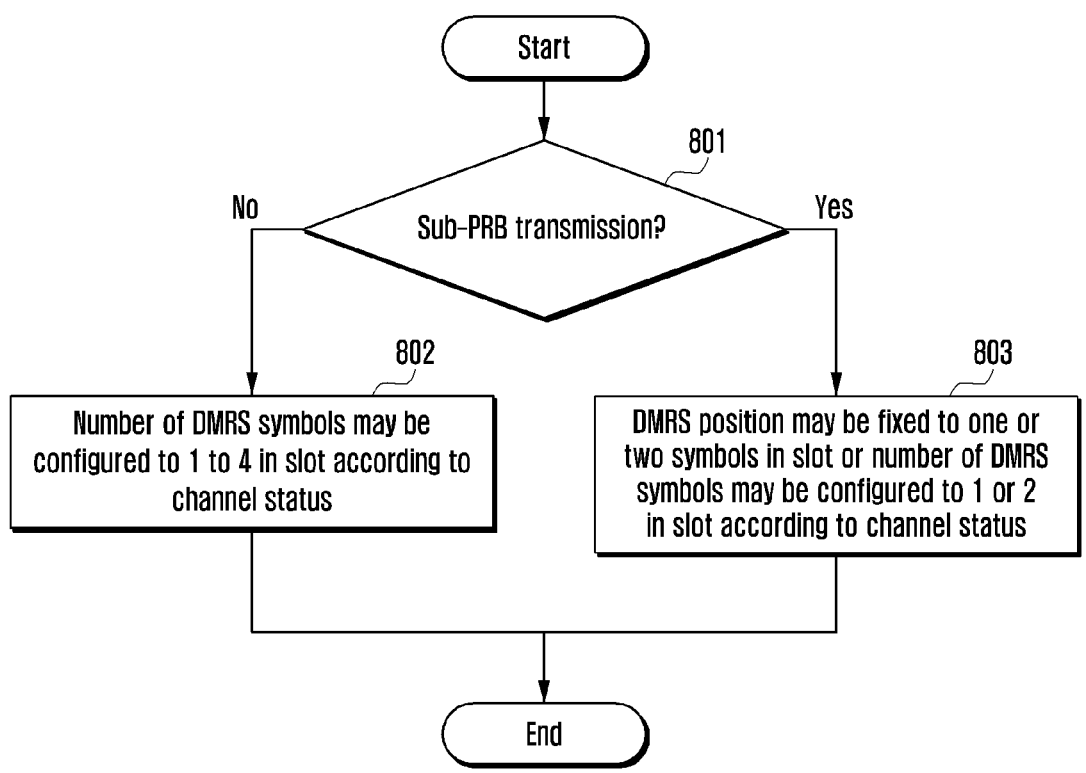
FIG. 8A illustrates an operation of a base station for determining a time domain pattern of a PUSCH DMRS during Sub-PRB transmission.
Figure 8B:
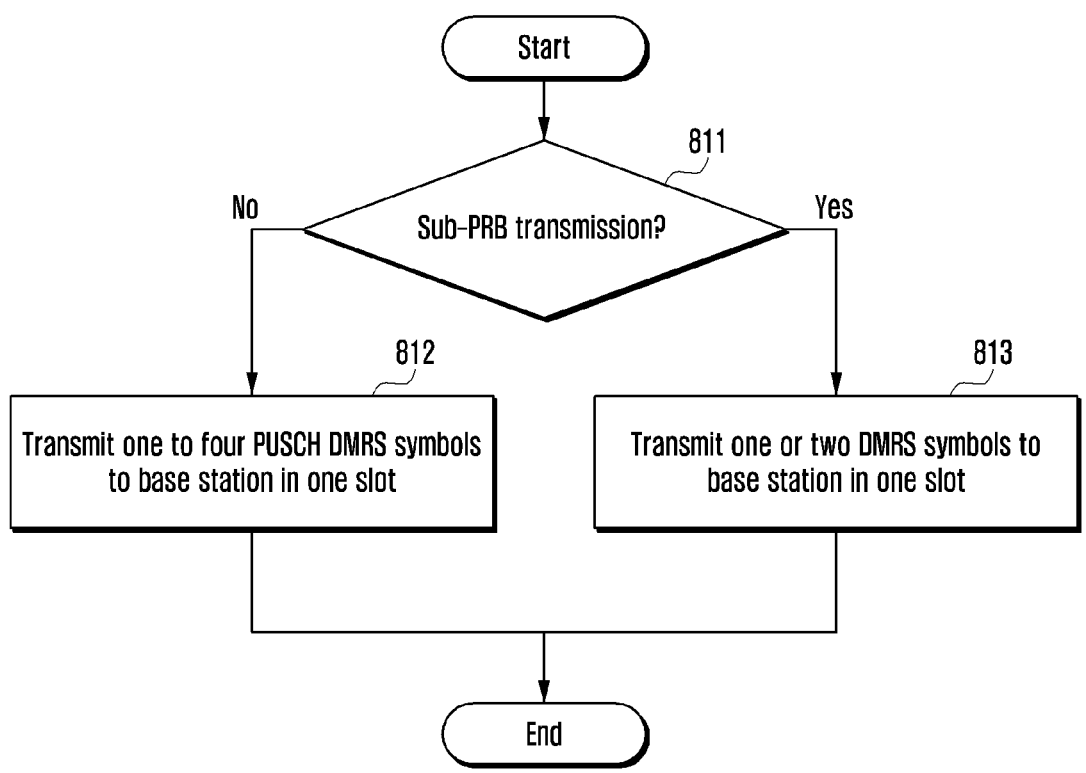
FIG. 8B illustrates a terminal operation for a time domain pattern of a PUSCH DMRS during Sub-PRB transmission.

FIGS. 8A and 8B are diagrams illustrating a method of configuring a PUSCH DMRS to a time domain during Sub-PRB transmission and operations of a base station and a terminal according to the method according to an embodiment of the disclosure.

FIG. 8A illustrates an operation of a base station for determining a time domain pattern of a PUSCH DMRS during Sub-PRB transmission.

Referring to FIG. 8A, in step 801, the base station may identify whether a transmission is Sub-PRB transmission. The base station may differently configure and indicate the PUSCH DMRS time domain pattern according to whether a transmission is Sub-PRB transmission.

If a transmission is not Sub-PRB transmission, the number of symbols in a time domain of the PUSCH DMRS that the base station can configure and indicate may be 1 to 4 in one slot in step 802. In this case, the number of corresponding PUSCH DMRS symbols may be configured through the higher layer.

If a transmission is Sub-PRB transmission, the base station may fix the DMRS symbol position to one or two in the slot by the method 3 or limit the number of DMRS symbols configurable by the method 1 to 1 or 2 in the slot to configure the number of DMRS symbols through a higher layer according to a channel status in step 803.

FIG. 8B illustrates a terminal operation for a time domain pattern of a PUSCH DMRS during Sub-PRB transmission.

Referring to FIG. 8B, the terminal may identify whether a transmission is Sub-PRB transmission in step 811. The terminal may transmit a different PUSCH DMRS time domain pattern to the base station according to whether Sub-PRB transmission is configured.

If a transmission is not Sub-PRB transmission, the terminal may transmit a PUSCH DMRS to the base station based on a determined number of symbols from 1 symbol to 4 symbols within one slot in step 812.

If a transmission is Sub-PRB transmission, the terminal may transmit a PUSCH DMRS to the base station based on 1 or 2 symbols in one slot in step 813.

During Sub-PRB transmission, the base station may bundle DMRS symbols within a configured $M_{slots}^{UL}$ slot to perform channel estimation for PUSCH transmission of the terminal.

Embodiment 2

Embodiment 2 presents a method in which the base station indicates the terminal to allocate resources for Sub-PRB transmission. When allocating resources in units of Sub-PRB, as in the method provided in Embodiment 1, the base station may transmit resource allocation configuration information to the terminal. In the disclosure, a method of indicating resource allocation information through DCI is considered, but the disclosure does not limit the method of indicating resource allocation information to a method of using DCI.

When the base station indicates the terminal to allocate resources for Sub-PRB transmission, at least one of the following information may be included in resource allocation information:

field selecting one PRB on a frequency for Sub-PRB transmission;

field indicating a carrier position at which Sub-PRB transmission is performed within one PRB;

field indicating PUSCH DMRS pattern information for Sub-PRB transmission;

field indicating this when data is mapped and transmitted to an additional time resource rather than the $M_{slots}^{UL}$ number of slots on a time during Sub-PRB transmission, and/or field indicating this when Sub-PRB transmission is repeatedly performed on a time resources.

In the disclosure, when the base station indicates the terminal to allocate resources for Sub-PRB transmission, necessary information is not limited to only the information described above. Further, some of the information may not be used.

For example, when one PRB is configured as a higher layer and Sub-PRB transmission is performed within the PRB, a field selecting one PRB on a frequency for Sub-PRB transmission may not be included in DCI.

Further, among the information, when a field indicating a carrier position at which Sub-PRB transmission is performed in one PRB is used, a field indicating PUSCH DMRS pattern information for Sub-PRB transmission may not be used. In this case, the PUSCH DMRS pattern may be determined by a resource allocation position on a frequency of data for Sub-PRB transmission.

Alternatively, when a method of indirectly indicating a carrier position at which Sub-PRB transmission is performed is used by PUSCH DMRS pattern during Sub-PRB transmission, a field indicating a carrier position at which Sub-PRB transmission is performed within one PRB may not be used.

In the following embodiment, a detailed method for indicating the information is provided.

First, a method of selecting one PRB on a frequency for Sub-PRB transmission will be described.

Figure 9A:
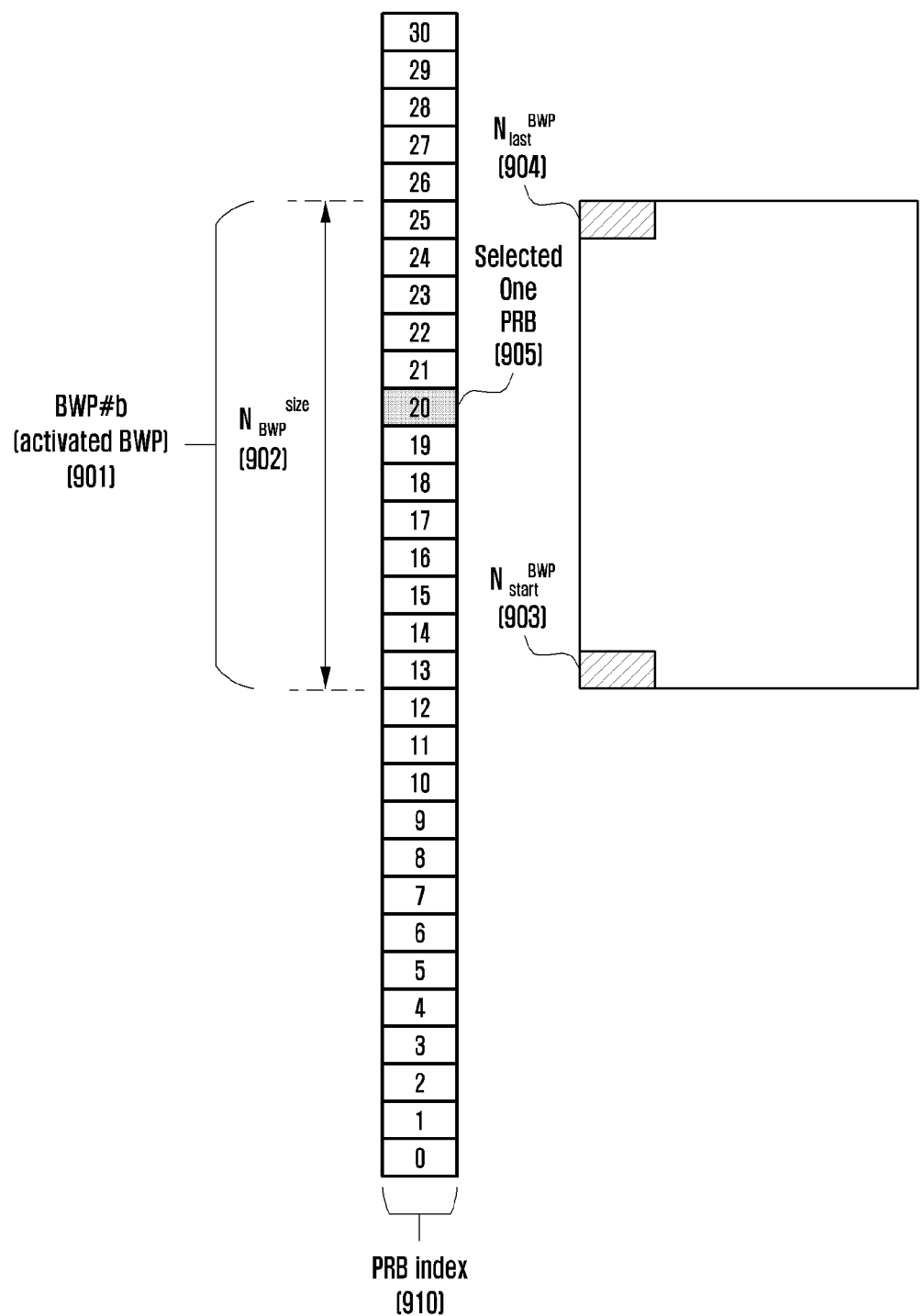
FIG. 9A illustrates an example in which a bandwidth part (BWP) of an uplink is configured.

FIG. 9A illustrates an example in which a bandwidth part (BWP) of an uplink is configured.

In FIG. 9A, an uplink bandwidth part #b, 901 corresponds to a currently activated bandwidth part. As a size of the bandwidth part #b, 901, $N_{BWP}^{size}$ 902=13 is obtained. Referring to FIG. 9A, $N_{BWP}^{size}$ 902 may be determined by $N_{start}^{BWP}$ 903=13 and $N_{last}^{BWP}$ 904=25. For Sub-PRB transmission, the base station may select one PRB within the uplink bandwidth part #b, 901. Further, the base station may indicate a carrier position at which Sub-PRB transmission is performed in the selected PRB. Accordingly, a bit field for indicating this may be represented by Equation 3.

$$\lceil \log_2 N_{BWP}^{size} \rceil + X \text{ bits} \qquad \text{[Equation 3]}$$

In Equation 3, $N_{BWP}^{size}$ denotes the number of PRBs in the activated uplink bandwidth part, and $\lceil \log_2 N_{BWP}^{size} \rceil$ denotes the number of bits required to select one PRB. X denotes the number of bits used for indicating a carrier position at which Sub-PRB transmission is performed in the selected PRB. An example of the Sub-PRB transmission method according to Equation 3 will be described with reference to FIG. 9B.

Figure 9B:
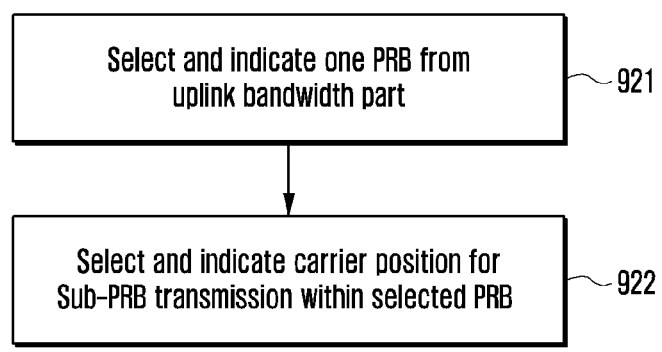
FIG. 9B is a flowchart illustrating a Sub-PRB transmission method according to an embodiment of the disclosure.

FIG. 9B is a flowchart illustrating a Sub-PRB transmission method according to an embodiment of the disclosure.

Referring to FIG. 9B, in order to perform Sub-PRB transmission, the base station may select one PRB in the uplink bandwidth part #b 901 and indicate the PRB to the terminal in step 921.

The base station may select a carrier position for Sub-PRB transmission within the selected PRB in the uplink bandwidth part #b, 901 and indicate the carrier position to the terminal in step 922. In Equation 3, a method of configuring information X indicating a carrier position at which Sub-PRB transmission is performed in one PRB is presented through the following embodiment. In the disclosure, a method of indicating resource allocation on a frequency for Sub-PRB transmission is not limited to Equation 3.

Hereinafter, a method of indicating a carrier position at which Sub-PRB transmission is performed within one PRB will be described. First, a method in which PUSCH data is consecutively mapped to the frequency domain during Sub-PRB transmission is considered. A detailed method in which PUSCH data is consecutively mapped to the frequency domain during Sub-PRB transmission may refer to 501 to 504 of FIG. 5. Further, a carrier position at which PUSCH data is transmitted in the PRB during Sub-PRB transmission may be indicated through Table 3A.

TABLE 3A

| Index | Set of Allocated subcarriers | Comment |
|---|---|---|
| 0 | 0, 1 | case where $M_{sc}^{RU} = 2$ is used with Sub-PRB transmission |
| 1 | 2, 3 | case where $M_{sc}^{RU} = 2$ is used with Sub-PRB transmission |
| 2 | 4, 5 | case where $M_{sc}^{RU} = 2$ is used with Sub-PRB transmission |
| 3 | 6, 7 | case where $M_{sc}^{RU} = 2$ is used with Sub-PRB transmission |
| 4 | 8, 9 | case where $M_{sc}^{RU} = 2$ is used with Sub-PRB transmission |
| 5 | 10, 11 | case where $M_{sc}^{RU} = 2$ is used with Sub-PRB transmission |
| 6 | 0, 1, 2 | case where $M_{sc}^{RU} = 3$ is used with Sub-PRB transmission |
| 7 | 3, 4, 5 | case where $M_{sc}^{RU} = 3$ is used with Sub-PRB transmission |
| 8 | 6, 7, 8 | case where $M_{sc}^{RU} = 3$ is used with Sub-PRB transmission |
| 9 | 9, 10, 11 | case where $M_{sc}^{RU} = 3$ is used with Sub-PRB transmission |
| 10 | 0, 1, 2, 4 | case where $M_{sc}^{RU} = 4$ is used with Sub-PRB transmission |
| 11 | 4, 5, 6, 7 | case where $M_{sc}^{RU} = 4$ is used with Sub-PRB transmission |
| 12 | 8, 9, 10, 11 | case where $M_{sc}^{RU} = 4$ is used with Sub-PRB transmission |
| 13 | 0, 1, 2, 3, 4, 5 | case where $M_{sc}^{RU} = 6$ is used with Sub-PRB transmission |
| 14 | 6, 7, 8, 9, 10, 11 | case where $M_{sc}^{RU} = 6$ is used with Sub-PRB transmission |
| 15 | reserved | |

Table 3A is a case in which 6, 4, 3, and 2 are considered as values of $M_{sc}^{RU}$. When Table 3A is used, X may be configured with 4 bits in Equation 3. When only 6 is considered as a value of $M_{sc}^{RU}$, only indices 13 and 14 are considered in Table 3A, thus, X may be configured with 1 bit. Therefore, a value of X may vary according to a value $M_{sc}^{RU}$ supported for Sub-PRB transmission. Further, a position at which PUSCH data is consecutively mapped to the frequency domain during Sub-PRB transmission is not limited to the position presented in Table 3A. For example, when 2 is considered as a value of $M_{sc}^{RU}$, a frequency position as illustrated in Table 3B may be considered.

TABLE 3B

| Index | Set of Allocated subcarriers |
|---|---|
| 0 | $N_{ID}^{cell} \bmod 2 + (0, 1)$ |
| 1 | $N_{ID}^{cell} \bmod 2 + (3, 4)$ |
| 2 | $N_{ID}^{cell} \bmod 2 + (6, 7)$ |
| 3 | $N_{ID}^{cell} \bmod 2 + (9, 10)$ |

In Table 3B, $N_{ID}^{cell}$ denotes a physical cell id.

Table 3A or Table 3B is only an embodiment provided in the disclosure, and the base station may indicate, to the terminal, a carrier position at which Sub-PRB transmission is performed based on predetermined Sub-PRB carrier information or Sub-PRB carrier information configured by the base station.

For example, the Sub-PRB carrier information may be preconfigured or defined to the base station and the terminal, as illustrated in Table 3A. By transmitting information indicating any one index through DCI, the base station may indicate a carrier position at which Sub-PRB transmission is performed.

Alternatively, the base station may transmit the Sub-PRB carrier information (e.g., information such as Table 3A) to the terminal through higher layer signaling, and by transmitting information indicating any one index through DCI, the base station may indicate a carrier position at which Sub-PRB transmission is performed.

Alternatively, when PUSCH data is non-consecutively mapped to the frequency domain during Sub-PRB transmission, a method of indicating a carrier position at which Sub-PRB transmission is performed in one PRB will be described.

A detailed method in which PUSCH data is non-consecutively mapped to the frequency domain during Sub-PRB transmission may refer to 505 to 509 of FIG. 5. Further, a carrier position at which PUSCH data is transmitted in the PRB during Sub-PRB transmission may be indicated through Table 4A.

TABLE 4A

| Index | Set of Allocated subcarriers | Comment |
|---|---|---|
| 0 | 0, 2 | case where $M_{sc}^{RU} = 2$ is used with Sub-PRB transmission |
| 1 | 1, 3 | case where $M_{sc}^{RU} = 2$ is used with Sub-PRB transmission |
| 2 | 4, 6 | case where $M_{sc}^{RU} = 2$ is used with Sub-PRB transmission |
| 3 | 5, 7 | case where $M_{sc}^{RU} = 2$ is used with Sub-PRB transmission |
| 4 | 8, 10 | case where $M_{sc}^{RU} = 2$ is used with Sub-PRB transmission |
| 5 | 9, 11 | case where $M_{sc}^{RU} = 2$ is used with Sub-PRB transmission |
| 6 | 0, 2, 4 | case where $M_{sc}^{RU} = 3$ is used with Sub-PRB transmission |
| 7 | 1, 3, 5 | case where $M_{sc}^{RU} = 3$ is used with Sub-PRB transmission |
| 8 | 6, 8, 10 | case where $M_{sc}^{RU} = 3$ is used with Sub-PRB transmission |
| 9 | 7, 9, 11 | case where $M_{sc}^{RU} = 3$ is used with Sub-PRB transmission |
| 10 | 0, 1, 6, 7, | case where $M_{sc}^{RU} = 4$ is used with Sub-PRB transmission |
| 11 | 2, 3, 8, 9 | case where $M_{sc}^{RU} = 4$ is used with Sub-PRB transmission |
| 12 | 4, 5, 10, 11 | case where $M_{sc}^{RU} = 4$ is used with Sub-PRB transmission |
| 13 | 0, 2, 4, 6, 8, 10 | case where $M_{sc}^{RU} = 6$ is used with Sub-PRB transmission |
| 14 | 1, 3, 5, 7, 9, 11 | case where $M_{sc}^{RU} = 6$ is used with Sub-PRB transmission |
| 15 | reserved | |

Table 4A is a case in which 6, 4, 3, and 2 are considered as values of $M_{sc}^{RU}$. When Table 4A is used, X may be configured with 4 bits in Equation 3. When only 6 is considered as a value of $M_{sc}^{RU}$, only indices 13 and 14 are considered in Table 4A; thus, X may be configured with 1 bit. Therefore, a value X may vary according to a value $M_{sc}^{RU}$ supported for Sub-PRB transmission. Further, a position at which PUSCH data is consecutively mapped to the frequency domain during Sub-PRB transmission is not limited to the position presented in Table 4A. For example, when 2 is considered as a value of $M_{sc}^{RU}$, a frequency position as illustrated in Table 4B may be considered.

TABLE 4B

| Index | Set of Allocated subcarriers |
|---|---|
| 0 | $2(N_{ID}^{cell} \bmod 2) + (0, 2)$ |
| 1 | $2(N_{ID}^{cell} \bmod 2) + (1, 3)$ |

TABLE 4B-continued

| Index | Set of Allocated subcarriers |
|---|---|
| 2 | $2(N_{ID}^{cell} \mod 2) + (6, 8)$ |
| 3 | $2(N_{ID}^{cell} \mod 2) + (7, 9)$ |

In Table 4B, $N_{ID}^{cell}$ denotes a physical cell id.

The above Table 4A or Table 4B is only an embodiment provided in the disclosure, and the base station may indicate, to the terminal, a carrier position at which Sub-PRB transmission is performed based on predetermined Sub-PRB carrier information or Sub-PRB carrier information configured by the base station.

For example, the Sub-PRB carrier information may be preconfigured or defined to the base station and the terminal, as illustrated in Table 4A. The base station may transmit information indicating any one index through DCI to indicate a carrier position at which Sub-PRB transmission is performed.

Alternatively, the base station may transmit the Sub-PRB carrier information (e.g., information such as Table 4A) to the terminal through higher layer signaling, and by transmitting information indicating any one index through DCI, the base station may indicate a carrier position at which the Sub-PRB transmission is performed.

It may be assumed that a frequency position at which the PUSCH DMRS is transmitted for Sub-PRB transmission is transmitted in a different OFDM symbol and in the same carrier as that of the PUSCH data indicated by the above suggested method. In other words, a frequency pattern of the PUSCH DMRS may be determined by a resource allocation position of PUSCH data on a frequency for Sub-PRB transmission. In this case, a field indicating the frequency position of the PUSCH DMRS pattern may not be separately used.

However, when a frequency allocation position of PUSCH data for Sub-PRB transmission and a frequency position of the PUSCH DMRS pattern are different, it is necessary to separately indicate pattern information on the frequency of the PUSCH DMRS. Therefore, in the following embodiment, a method of indicating PUSCH DMRS pattern information during Sub-PRB transmission will be described on the assumption on a case in which a field indicating a frequency position oaf PUSCH DMRS pattern is required.

Table 5 may be used for indicating PUSCH DMRS pattern information during Sub-PRB transmission. Table 5 is configured based on a DMRS pattern supported in the 5G NR system, and a method of indicating PUSCH DMRS pattern information during Sub-PRB transmission in the disclosure is not limited to Table 5. Therefore, a DMRS pattern different from the DMRS pattern indicated in Table 5 may be applied. Other applicable DMRS patterns refer to FIGS. 6A to 6C.

TABLE 5

| Index | Number of DM-RS CDM groups without data | DM-RS Ports | Comment |
|---|---|---|---|
| 0 | 1 | port 0 (type1) | DM-RS configuration type 1 (see DMRS pattern 605-1 of FIG. 6) |
| 1 | 2 | port 0 (type1) | DM-RS configuration type 1 (see DMRS pattern 605-1 of FIG. 6) |

TABLE 5-continued

| Index | Number of DM-RS CDM groups without data | DM-RS Ports | Comment |
|---|---|---|---|
| 2 | 2 | port 2 (type1) | DM-RS configuration type 1 (see DMRS pattern 605-2 of FIG. 6) |
| 3 | 3 | port 0 (type2) | DM-RS configuration type 1 (see DMRS pattern 606-1 of FIG. 6) |
| 4 | 3 | port 2 (type2) | DM-RS configuration type 1 (see DMRS pattern 606-2 of FIG. 6) |
| 5 | 3 | port 4 (type2) | DM-RS configuration type 1 (see DMRS pattern 606-3 of FIG. 6) |
| 6 | 4 | port 0 (type1 based pattern A) | based on DM-RS configuration type 1 (see DMRS pattern 607-1 of FIG. 6) |
| 7 | 4 | port 1 (type1 based pattern A) | based on DM-RS configuration type 1 (see DMRS pattern 607-2 of FIG. 6) |
| 8 | 5 | port 2 (type1 based pattern A) | based on DM-RS configuration type 1 (see DMRS pattern 607-3 of FIG. 6) |
| 9 | 4 | port 3 (type1 based pattern A) | based on DM-RS configuration type 1 (see DMRS pattern 607-4 of FIG. 6) |
| 10 | 6 | port 0 (type1 based pattern B) | based on DM-RS configuration type 1 (see DMRS pattern 608-1 of FIG. 6) |
| 11 | 6 | port 1 (type1 based pattern B) | based on DM-RS configuration type 1 (see DMRS pattern 608-2 of FIG. 6) |
| 12 | 6 | port 2 (type1 based pattern B) | based on DM-RS configuration type 1 (see DMRS pattern 608-3 of FIG. 6) |
| 13 | 6 | port 3 (type1 based pattern B) | based on DM-RS configuration type 1 (see DMRS pattern 608-4 of FIG. 6) |
| 14 | 6 | port 4 (type1 based pattern B) | based on DM-RS configuration type 1 (see DMRS pattern 608-5 of FIG. 6) |
| 15 | 6 | port 5 (type1 based pattern B) | based on DM-RS configuration type 1 (see DMRS pattern 608-6 of FIG. 6) |

In Table 5, an index 0 may be indicated when power boosting for a PUSCH DMRS is not used during Sub-PRB transmission. In Table 5, indexes 1 to 15 may be indicated when power boosting for a PUSCH DMRS is used during Sub-PRB transmission. A detailed description on power boosting for a PUSCH DMRS refer to Embodiment 3.

In Table 5, type1 and type2 may indicate DM-RS configuration types 1 and 2, respectively supported in a 5G NR system. Further, type1 based patterns A and B are new PUSCH DMRS patterns considered based on a DM-RS configuration type 1 during Sub-PRB transmission and a detailed description thereof will be with reference to FIGS. 6A to 6C.

It may be assumed that a frequency position at which PUSCH data for Sub-PRB transmission is transmitted is the same carrier as that of the PUSCH DMRS indicated by the above-described method and a different OFDM symbol. In other words, a position on a frequency to which PUSCH data is allocated may be determined by a frequency pattern of a PUSCH DMRS for Sub-PRB transmission. In this case, a field indicating a frequency allocation position of PUSCH data for Sub-PRB transmission may not be separately used. Therefore, when Table 5 is used for indicating a frequency allocation position of PUSCH data for Sub-PRB transmission, in Equation 3, information X indicating a carrier position at which sub-PRB transmission is performed in one PRB may be configured with 4 bits. However, it should be noted that the X value may vary according to the index considered in Table 5.

When the frequency allocation position of the PUSCH data for Sub-PRB transmission and the frequency position of the PUSCH DMRS pattern are different, it is necessary to separately indicate frequency allocation position information of the PUSCH data.

Embodiment 3

Embodiment 3 presents a method of controlling power by using a frequency domain smaller than one PRB during Sub-PRB transmission. In this case, a method of controlling use power may have the following two different purposes:

Power saving: by using a frequency domain smaller than one PRB during Sub-PRB transmission, lower power may be allocated. This may bring about the effect of reducing power consumption; and Coverage enhancement: by using a frequency domain smaller than one PRB during Sub-PRB transmission, additional power boosting may be performed in an unused frequency domain. This may be a major factor in improving coverage by using more power.

Power control for PUSCH data transmission may be performed, and the corresponding process may be represented by Equation 4. Detailed parameters for Equation 4 refer to TS 38.213.

[Equation 4]

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} \text{[dBm]}$$

In the above equation, $M_{RB,b,f,c}^{PUSCH}(i)$ denotes a PUSCH resource allocation a frequency band and may be defined as the number of PRBs allocated to an uplink transmission cell c, a carrier f, a bandwidth part #b, and a PUSCH transmission time point i. In general, as $M_{RB,b,f,c}^{PUSCH}(i)$ increases, more power is consumed for PUSCH data transmission, and as $M_{RB,b,f,c}^{PUSCH}(i)$ decreases, less power is consumed for PUSCH data transmission. When a frequency domain smaller than one PRB is used for Sub-PRB transmission, the following method of configuring the $M_{RB,b,f,c}^{PUSCH}(i)$ value may be used for the above purpose.

Method 1 (Power saving): $M_{RB,b,f,c}^{PUSCH}(i) = M_{sc}^{RU}/N_{sc}^{RB}$.

Method 2 (Coverage enhancement): $M_{RB,b,f,c}^{PUSCH}(i)=1$.

When the first method is used, a frequency domain smaller than one PRB is used ($M_{sc}^{RU} < N_{sc}^{RB}$), so that lower power may be allocated. Conversely, when the second method is used, a frequency domain smaller than one PRB is used ($M_{sc}^{RU} < N_{sc}^{RB}$), but power corresponding to one PRB may be maintained as it is. In other words, power of $$10\log_{10}\frac{N_{sc}^{RB}}{M_{sc}^{RU}}$$

dB may be additionally boosted to the frequency domain used for Sub-PRB transmission.

Figure 10A:
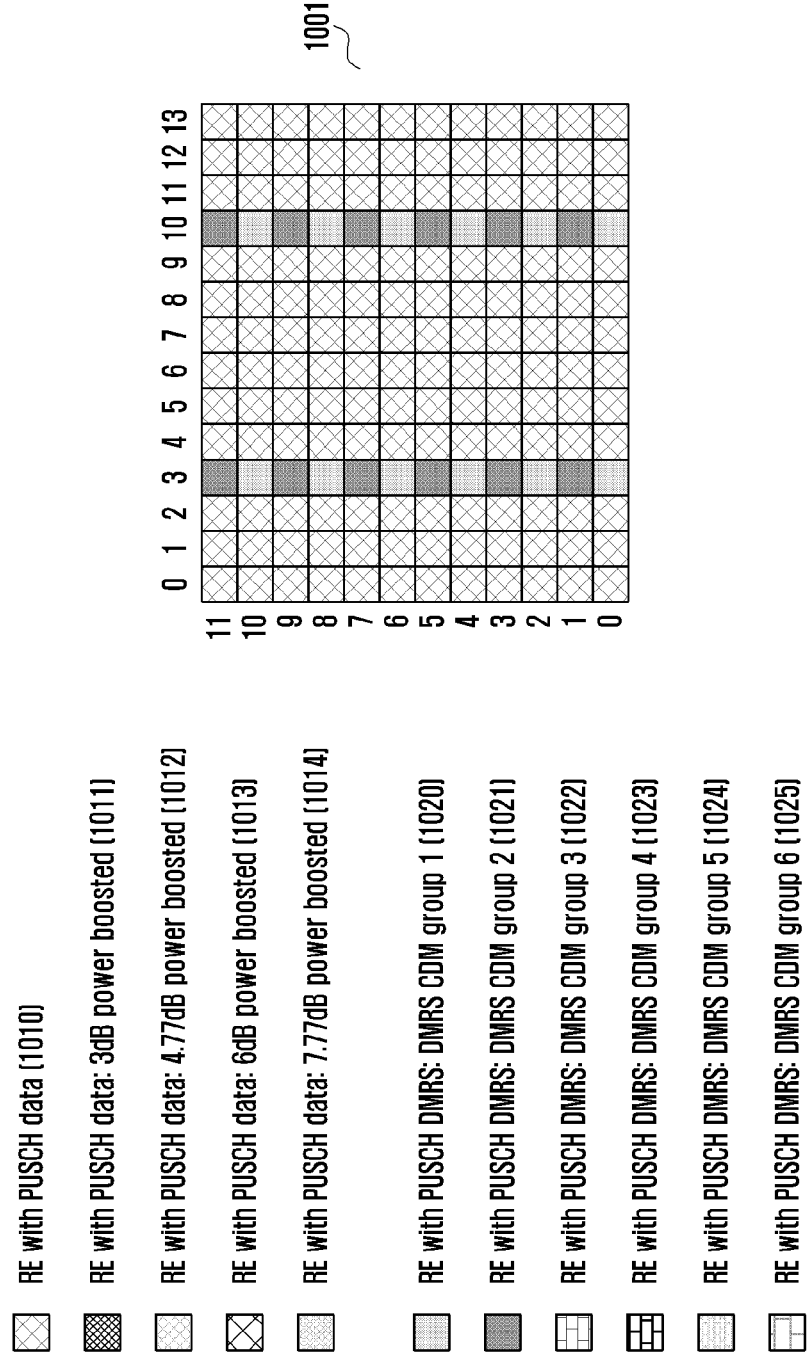
FIG. 10A illustrates an example in which power is adjusted by using a frequency domain smaller than one PRB during Sub-PRB transmission.
Figure 10B:
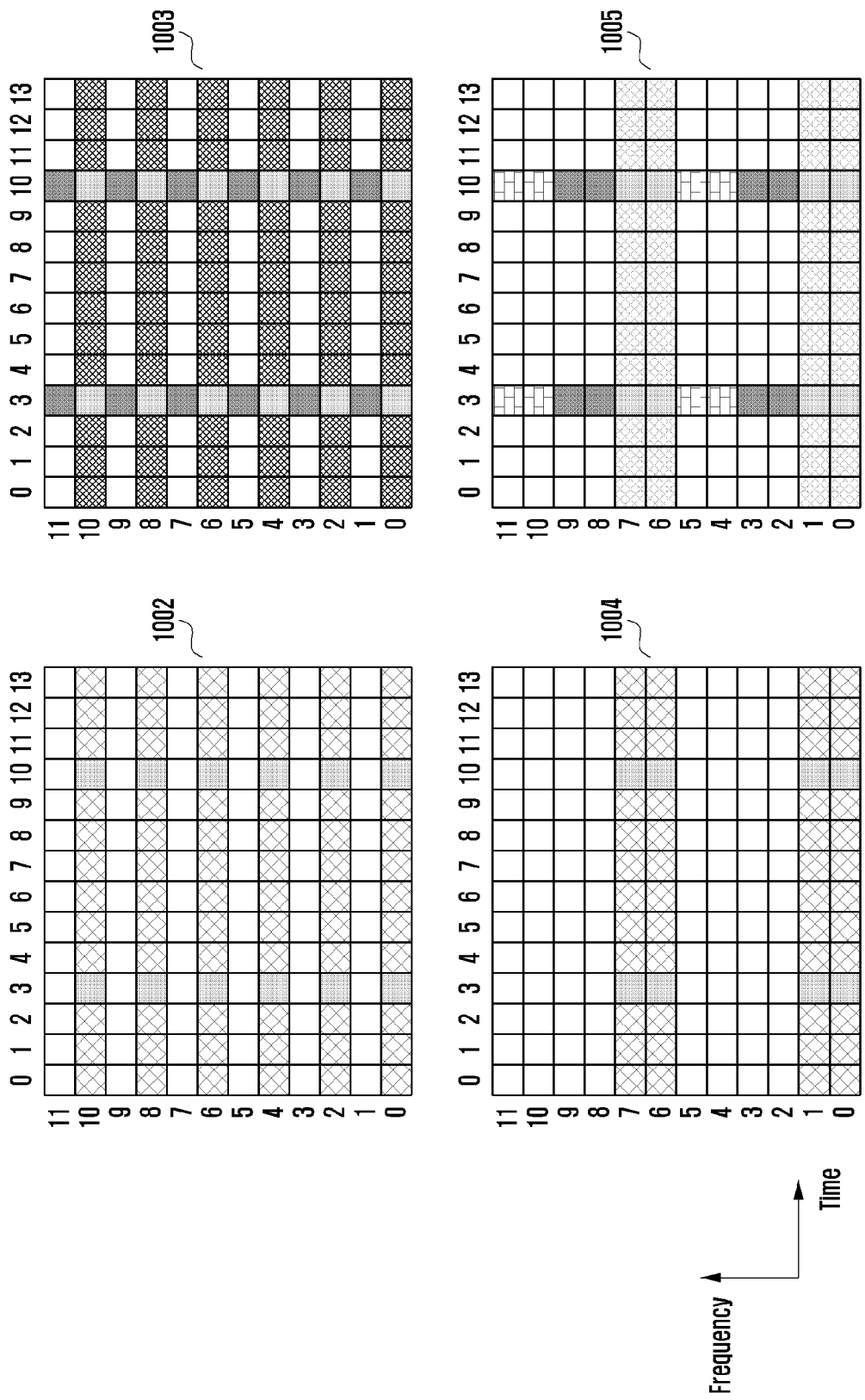
FIG. 10B illustrates an example in which power is adjusted by using a frequency domain smaller than one PRB during Sub-PRB transmission.
Figure 10C:
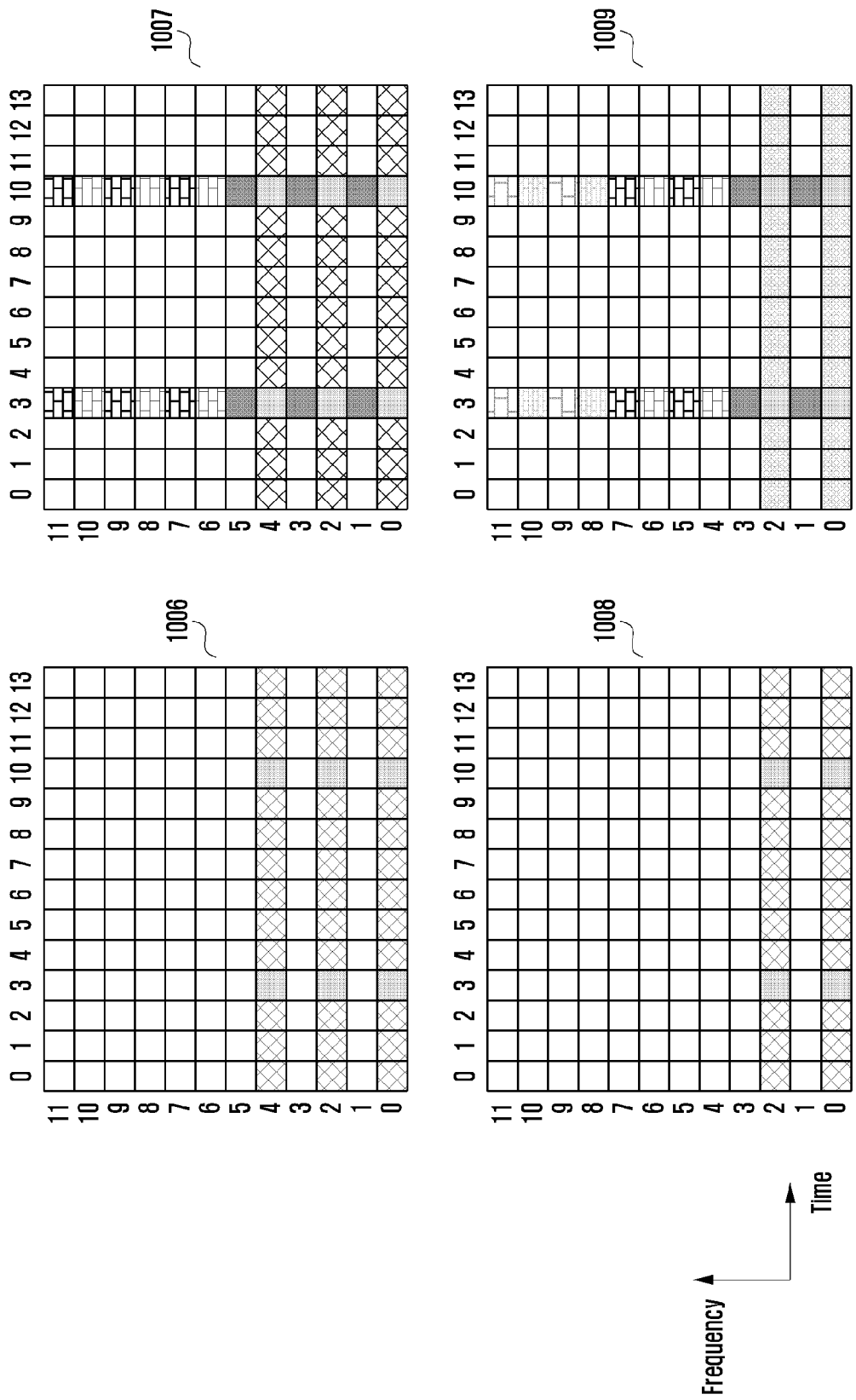
FIG. 10C illustrates an example in which power is adjusted by using a frequency domain smaller than one PRB during Sub-PRB transmission.

FIGS. 10A, 10B, and 10C illustrate an example in which power is adjusted by using a frequency domain smaller than one PRB during Sub-PRB transmission.

Specifically, there is provided a method in which power of the PUSCH DMRS is adjusted for each of the case in which the method 1 is used and the case in which the method 2 is used.

It should be noted that a PUSCH DMRS pattern on a frequency illustrated in FIGS. 10A, 10B, and 10C is illustrated based on a pattern supported in the 5G NR system. Accordingly, according to an embodiment of the disclosure, a DMRS pattern different from the DMRS pattern illustrated in FIGS. 10A, 10B, and 10C may be applied. Other applicable DMRS patterns refer to FIGS. 6A to 6C. Further, the disclosure is not limited to a position of the PUSCH DMRS pattern on a time illustrated in FIGS. 10A, 10B, and 10C. For example, in FIGS. 10A to 10C, the DMRS is positioned in the 4th and 11th OFDM symbols, but when only one DMRS symbol is considered, the DMRS may be positioned in the 4th or 6th OFDM symbol.

First, 1001 of FIG. 10A illustrates an example in which power is adjusted when a resource for DFT-S-OFDM-based PUSCH transmission is allocated to all carriers of one PRB in a 5G NR system. Because all one PRB was used, in Equation 4, $M_{RB,b,f,c}^{PUSCH}(i)=1$ may be obtained. In the case of a PUSCH DMRS, a comb pattern (DMRS CDM group 1) of a length 2 corresponding to 1020 may be used. In this case, power may be boosted by 3 dB to the PUSCH DMRS by additionally using a DMRS CDM group 2 corresponding to 1021. In this case, a DMRS is not actually transmitted to a position corresponding to 1021. Specifically, referring to Table 6, a ratio $\beta_{DMRS}$ [dB] of a PUSCH energy per resource element (EPRE) to a DMRS EPRE is defined, and the terminal may make an assumption about power of the PUSCH DMRS. Further, a power boosting value $$\beta_{PUSCH}^{DMRS} = 10^{\frac{\beta_{DMRS}}{20}}$$

may be applied to the DMRS by assuming $\beta_{DMRS}$ when the PUSCH DMRS is transmitted. Further, the base station may indicate a value corresponding to $\beta_{DMRS}$ as the number of DMRS CDM groups to the terminal through DCI.

TABLE 6

| Number of DM-RS CDM groups without data | DM-RS configuration type 1 | DM-RS configuration type 2 |
|---|---|---|
| 1 | 0 dB | 0 dB |
| 2 | −3 dB | −3 dB |
| 3 | — | −4.77 dB |

In Table 6, only a DM-RS configuration type 1 may be supported during DFT-S-OFDM-based PUSCH transmission in the 5G NR system. As described above, the base station always indicates 2 as the number of DMRS CDM groups to the terminal; thus, power is boosted by 3 dB to the PUSCH DMRS.

1002, 1004, 1006, and 1008 of FIGS. 10B to 10C illustrate a case of using low power by allocating PUSCH data to a small number of carriers, compared to the case of transmitting PUSCH data to all carriers of one PRB by using the method 1 during Sub-PRB transmission. When the method 1 is used for the purpose of maintaining constant power of a symbol in which a PUSCH DMRS is transmitted and power of a symbol in which PUSCH data is transmitted, it may not be desirable to boost power to the PUSCH DMRS using a plurality of DMRS CDM groups. Therefore, when the method 1 is used, it may be assumed that $\beta_{DMRS}=0$ [dB] at 1002, 1004, 1006, and 1008.

Alternatively, 1003, 1005, 1007, and 1009 of FIGS. 10B to 10C illustrate a case of performing additional power boosting for an unused frequency domain when a frequency domain smaller than one PRB is used by using the method 2 during Sub-PRB transmission. Power of a DMRS may be boosted in a symbol in which a PUSCH DMRS is transmitted on the assumption that power of a symbol in which the PUSCH DMRS is transmitted and power of a symbol in which PUSCH data is transmitted are maintained constant. Specifically, as illustrated in Table 7, a ratio $\beta_{DMRS}$ [dB] of the PUSCH EPRE to the DMRS EPRE is defined, and the terminal may make an assumption about power of the PUSCH DMRS. Further, a power boosting value $$\beta_{PUSCH}^{DMRS} = 10^{\frac{\beta_{DMRS}}{20}}$$

may be applied to the DMRS by assuming $\beta_{DMRS}$ when the PUSCH DMRS is transmitted. Further, the base station may indicate a value corresponding to $\beta_{DMRS}$ with the number of DMRS CDM groups to the terminal through DCI.

TABLE 7

| Number of DM-RS CDM groups without data | $\beta_{DMRS}$ | Comment |
| --- | --- | --- |
| 1 | 0 dB | |
| 2 | −3 dB | When it is configured that $M_{sc}^{MU} = 6$ by Sub-PRB transmission and a pattern of 6 DMRS REs on a frequency is used |
| 3 | −4.77 dB | When it is configured that $M_{sc}^{MU} = 4$ by Sub-PRB transmission and a pattern of 4 DMRS REs on a frequency is used |
| 4 | −6 dB | When it is configured that $M_{sc}^{MU} = 3$ by Sub-PRB transmission and a pattern of 3 DMRS REs on a frequency is used |
| 6 | −7.78 dB | When it is configured that $M_{sc}^{MU} = 2$ by Sub-PRB transmission and a pattern of 2 DMRS REs on a frequency is used |

In FIG. 10B, in the case of 1003, when $N_{sc}^{RB}=12$ is assumed, a case having $M_{sc}^{RU}$ of 6 is illustrated. By using the method 2, it may be assumed that $M_{RB,b,f,c}^{PUSCH}(i)=1$ in Equation 4, and as illustrated in 1003, 3 dB power may be boosted in a data region 1011 to which the PUSCH is allocated. Therefore, referring to Table 7, power may be boosted by 3 dB to the PUSCH DMRS by using two DMRS CDM groups in Table 7. In this case, the DMRS may not be actually transmitted to a position corresponding to 1021.

In FIG. 10B, in the case of 1005, when $N_{sc}^{RB}=12$ is assumed, a case having $M_{sc}^{RU}$ of 4 is illustrated. By using the method 2, it may be assumed that $M_{RB,b,f,c}^{PUSCH}(i)=1$ in Equation 4, and as illustrated in 1005, 4.77 dB power may be boosted in a data region 1012 to which the PUSCH is allocated. Therefore, referring to Table 7, power may be boosted by 4.77 dB to the PUSCH DMRS using three DMRS CDM groups in Table 7. In this case, the DMRS may not be actually transmitted to positions corresponding to 1021 and 1022.

In FIG. 10C, in the case of 1007, when $N_{sc}^{RB}=12$ is assumed, a case having $M_{sc}^{RB}$ of 3 is illustrated. By using the method 2, it may be assumed that $M_{RB,b,f,c}^{PUSCH}(i)=1$ in Equation 4, and as illustrated in 1007, 6 dB power may be boosted in a data region 1013 to which the PUSCH is allocated. Therefore, referring to Table 7, power may be boosted by 6 dB to the PUSCH DMRS using four DMRS CDM groups in Table 7. In this case, the DMRS may not be actually transmitted to positions corresponding to 1021, 1022, and 1023.

In FIG. 10C, in the case of 1009, when $N_{sc}^{RB}=12$ is assumed, a case having $M_{sc}^{RU}$ of 2 is illustrated. By using the method 2, it may be assumed that $M_{RB,b,f,c}^{PUSCH}(i)=1$ in Equation 4, and as illustrated in 1009, 7.77 dB power may be boosted in a data region 1014 to which the PUSCH is allocated. Therefore, referring to Table 7, power may be boosted by 7.77 dB to the PUSCH DMRS using six DMRS CDM groups in Table 7. In this case, the DMRS may not be actually transmitted to positions corresponding to 1021, 1022, 1023, 1024, and 1025.

As described above, it should be noted that the disclosure is not limited to the DMRS pattern illustrated in FIGS. 10A to 10C during Sub-PRB transmission. For example, when $N_{sc}^{RB}=12$ is assumed, in the case in which $M_{sc}^{RU}$ is 6, when a pattern having 3 as the number of DMRS REs on a frequency is used, power may be boosted by 6 dB to the PUSCH DMRS using four DMRS CDM groups.

Figure 11:
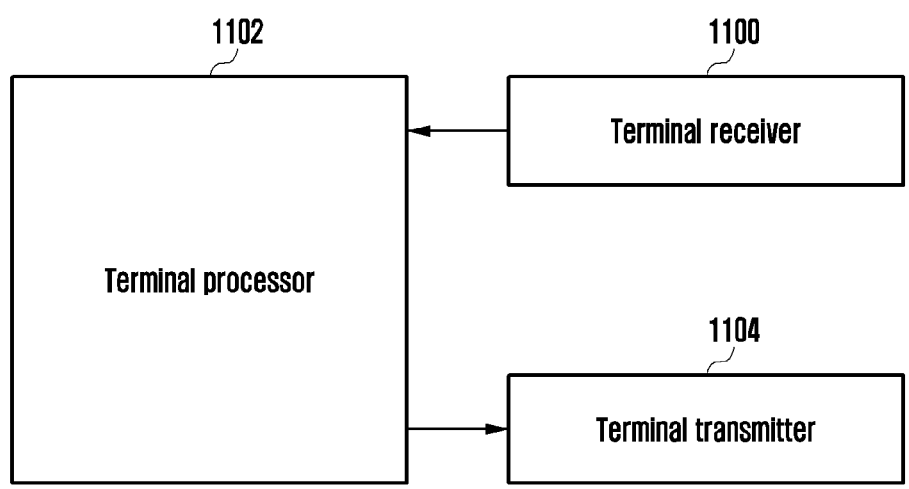
FIG. 11 is a block diagram illustrating an internal structure of a terminal according to an embodiment of the disclosure.
Figure 12:
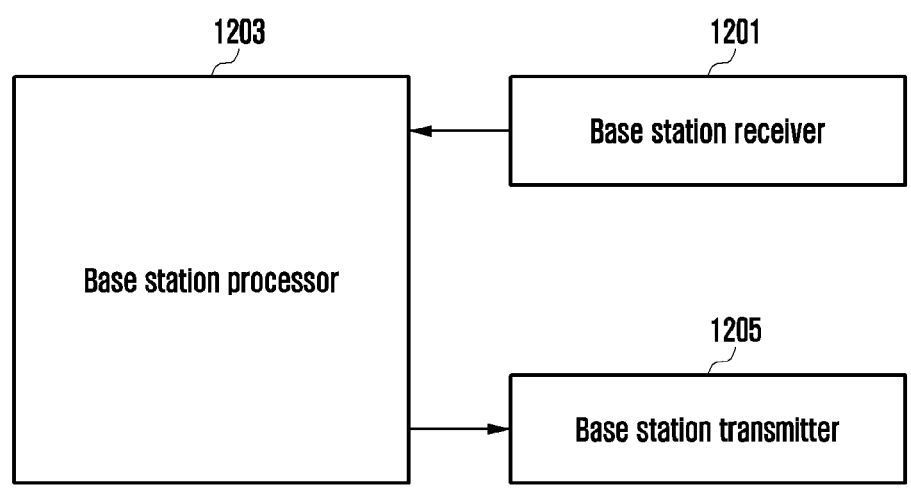
FIG. 12 is a block diagram illustrating an internal structure of a base station according to an embodiment of the disclosure.

In order to perform the above embodiments of the disclosure, a transmitter, a receiver, and a processor of each of the terminal and the base station are illustrated in FIGS. 11 and 12. In the above embodiments, there is illustrated a method for performing Sub-PRB transmission, which is a method of allocating resources in a frequency domain smaller than one PRB during PUSCH transmission, and in order to perform this, each of the receiver, the processer, and the transmitter of the base station and the terminal may operate according to the embodiment.

Specifically, FIG. 11 is a block diagram illustrating an internal structure of a terminal according to an embodiment of the disclosure.

As illustrated in FIG. 11, the terminal of the disclosure may include a terminal receiver 1100, a terminal transmitter 1104, and a terminal processor 1102. The terminal receiver 1100 and the terminal transmitter 1104 may be collectively referred to as a transceiver in the embodiment of the disclosure. The transceiver may transmit and receive a signal to and from the base station. The signal may include control information and data. To this end, the transceiver may include an RF transmitter for up-converting and amplifying a frequency of a signal to be transmitted, and an RF receiver for low-noise amplifying a received signal and down-converting a frequency thereof. Further, the transceiver may receive a signal through a wireless channel and output the signal to the terminal processer 1102, and transmit the signal output from the terminal processer 1102 through a wireless channel. The terminal processer 1102 may control a series of processes so that the terminal may operate according to the above-described embodiment of the disclosure.

FIG. 12 is a block diagram illustrating an internal structure of a base station according to an embodiment of the disclosure.

As illustrated in FIG. 12, the base station of the disclosure may include a base station receiver 1201, a base station transmitter 1205, and a base station processer 1203. The base station receiver 1201 and the base station transmitter 1205 may be collectively referred to as a transceiver in the embodiment of the disclosure. The transceiver may transmit and receive a signal to and from the terminal. The signal may include control information and data. To this end, the transceiver may include an RF transmitter for up-converting and amplifying a frequency of a signal to be transmitted, and an RF receiver for low-noise amplifying a received signal and down-converting a frequency thereof. Further, the transceiver may receive a signal through a wireless channel and output the signal to the base station processer 1203, and transmit a signal output from the terminal processer 1203 through the wireless channel. The base station processer 1203 may control a series of processes so that the base station may operate according to the above-described embodiment of the disclosure.

The embodiments of the disclosure disclosed in this specification and drawings merely present specific examples to easily explain the technical contents of the disclosure and help the understanding of the disclosure, and they are not intended to limit the scope of the disclosure. That is, it is apparent to those of ordinary skill in the art to which the disclosure pertains that other modifications based on the technical spirit of the disclosure are possible. Further, each of the above embodiments may be operated in combination with each other, as needed. For example, in all embodiments of the disclosure, parts may be combined with each other to operate the base station and the terminal.

The disclosure provides a method for supporting resource allocation in a frequency domain smaller than one PRB during PUSCH transmission. The provided method can be effectively used for improving PUSCH coverage.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
receiving configuration information on a sub physical resource block (PRB) for a physical uplink shared channel (PUSCH) transmission;
receiving downlink control information (DCI) including a bit field indicating a subcarrier set of a plurality of subcarrier sets respectively including subcarriers of the sub PRB, wherein a number of the subcarriers of the sub PRB is configured based on the configuration information and less than a number of subcarriers of one PRB; and
transmitting a PUSCH on the subcarrier set indicated by the bit field,
wherein a number of bits included in the bit field is identified based on the number of the subcarriers of the sub PRB.

2. The method of claim 1, wherein the number of subcarriers of the sub PRB is configured as one of 2, 3, 4, or 6, and
wherein information on the plurality of subcarrier sets is preconfigured to the terminal or is included in the configuration information.

3. The method of claim 1, wherein a PUSCH demodulation reference signal (DMRS) is transmitted on a subcarrier of the subcarrier set indicated by the bit field.

4. The method of claim 1, further comprising:
transmitting a PUSCH DMRS based on a PUSCH DMRS pattern, wherein the DCI includes information indicating the PUSCH DMRS pattern.

5. A method performed by a base station in a communication system, the method comprising:
transmitting configuration information on a sub physical resource block (PRB) for a physical uplink shared channel (PUSCH) transmission;
transmitting downlink control information (DCI) including a bit field indicating a subcarrier set of a plurality of subcarrier sets respectively including subcarriers of the sub PRB, wherein a number of the subcarriers of the sub PRB is indicated based on the configuration information and less than a number of subcarriers of one PRB; and
receiving a PUSCH on the subcarrier set indicated by the bit field,
wherein a number of bits included in the bit field is associated with the number of the subcarriers of the sub PRB.

6. The method of claim 5, wherein the number of subcarriers of the sub PRB is indicated as one of 2, 3, 4, or 6, and
wherein information on the plurality of subcarrier sets is preconfigured to a terminal or is included in the configuration information.

7. The method of claim 5, wherein a PUSCH demodulation reference signal (DMRS) is received on a subcarrier of the subcarrier set indicated by the bit field.

8. The method of claim 5, further comprising
receiving a PUSCH DMRS associated with a PUSCH DMRS pattern, wherein the DCI includes information indicating the PUSCH DMRS pattern.

9. A terminal in a communication system, the terminal comprising:
a transceiver; and
a processor coupled to the transceiver, the processor configured to:
receive configuration information on a sub physical resource block (PRB) for a physical uplink shared channel (PUSCH) transmission;
receive downlink control information (DCI) including a bit field indicating a subcarrier set of a plurality of subcarrier sets respectively including subcarriers of the sub PRB, wherein a number of the subcarriers of the sub PRB is configured based on the configuration information and less than a number of subcarriers of one PRB; and
transmit a PUSCH on the subcarrier set indicated by the bit field,
wherein a number of bits included in the bit field is identified based on the number of the subcarriers of the sub PRB.

10. The terminal of claim 9, wherein the number of subcarriers of the sub PRB is configured as one of 2, 3, 4, or 6, and wherein information on the plurality of subcarrier sets is preconfigured to the terminal or is included in the configuration information.

11. The terminal of claim 9, wherein a PUSCH demodulation reference signal (DMRS) is transmitted on a subcarrier of the subcarrier set indicated by the bit field.

12. The terminal of claim 9, wherein
the processor is further configured to transmit a PUSCH DMRS based on a PUSCH DMRS pattern, and
wherein the DCI includes information indicating the PUSCH DMRS pattern.

13. A base station in a communication system, the base station comprising:
a transceiver; and
a processor coupled to the transceiver, the processor configured to:
transmit configuration information on a sub physical resource block (PRB) for a physical uplink shared channel (PUSCH) transmission;
transmit downlink control information (DCI) including a bit field indicating a subcarrier set of a plurality of subcarrier sets respectively including subcarriers of the sub PRB, wherein a number of the subcarriers of the sub PRB is indicated based on the configuration information and less than a number of subcarriers of one PRB; and
receive a PUSCH on the subcarrier set indicated by the bit field,
wherein a number of bits included in the bit field is associated with the number of the subcarriers of the sub PRB.

14. The base station of claim 13, wherein the number of subcarriers of the sub PRB is indicated as one of 2, 3, 4, or 6, and
wherein information on the plurality of subcarrier sets is preconfigured to a terminal or is included in the configuration information.

15. The base station of claim 13, wherein a PUSCH demodulation reference signal (DMRS) is received on a subcarrier of the subcarrier set indicated by the bit field.

16. The base station of claim 13,
wherein the processor is further configured to receive a PUSCH DMRS associated with a PUSCH DMRS pattern, and
wherein the DCI includes information indicating the PUSCH DMRS pattern.

17. The method of claim 1, wherein the subcarriers of the sub PRB are non-consecutive in a frequency domain.

18. The method of claim 5, wherein the subcarriers of the sub PRB are non-consecutive in a frequency domain.

19. The terminal of claim 9, wherein the subcarriers of the sub PRB are non-consecutive in a frequency domain.

20. The base station of claim 13, wherein the subcarriers of the sub PRB are non-consecutive in a frequency domain.

* * * * *